United States Patent [19]

Nakano et al.

[11] Patent Number: 6,011,787
[45] Date of Patent: Jan. 4, 2000

[54] CDMA MOBILE COMMUNICATION SCHEME WITH EFFECTIVE USE OF SECTOR CONFIGURATION

[75] Inventors: Etsuhiro Nakano; Takehiro Nakamura, both of Yokosukashi; Seizo Onoe, Yokohamashi, all of Japan

[73] Assignee: NTT Mobile Communications Network Inc., Tokyo, Japan

[21] Appl. No.: 08/821,347

[22] Filed: Mar. 20, 1997

[30] Foreign Application Priority Data

Mar. 21, 1996 [JP] Japan ..................... 8-064924

[51] Int. Cl.⁷ .............................. H04B 7/216; H04B 1/69
[52] U.S. Cl. ......................... 370/335; 375/200; 455/422
[58] Field of Search ..................... 370/320, 328, 370/332, 335, 342, 441, 237, 230; 375/200; 455/422

[56] References Cited

U.S. PATENT DOCUMENTS

| | | | |
|---|---|---|---|
| 5,193,109 | 3/1993 | Chien-Yeh Lee | 379/60 |
| 5,230,081 | 7/1993 | Yamada et al. | 455/33.1 |
| 5,309,474 | 5/1994 | Gilhousen et al. | |
| 5,535,423 | 7/1996 | Dupuy | 455/33.1 |
| 5,570,373 | 10/1996 | Wing | 371/5.1 |
| 5,673,260 | 9/1997 | Umeda et al. | 370/342 |
| 5,751,761 | 5/1998 | Gilhousen | 375/200 |
| 5,771,449 | 6/1998 | Blasing et al. | 455/422 |
| 5,841,806 | 11/1998 | Gilhousen et al. | 375/206 |

FOREIGN PATENT DOCUMENTS

| | | |
|---|---|---|
| 0 652 644 | 5/1995 | European Pat. Off. . |
| 0 693 834 | 1/1996 | European Pat. Off. . |
| WO 95/01068 | 1/1995 | WIPO . |

*Primary Examiner*—Ajit Patel
*Assistant Examiner*—Brian Nguyen
*Attorney, Agent, or Firm*—Oblon, Spivak, McClelland, Maier & Neustadt, P.C.

[57] ABSTRACT

A CDMA mobile communication scheme capable of increasing a number of sectors while not increasing a number of perch channel spread codes and not jamming the control channel traffic, so as to obtain the capacity increase effect by the use of the sector configuration effectively. At the base station, a perch channel spread by an identical perch channel spread code assigned to the base station is transmitted from each one of at least two sectors of the base station. Then, upward signals from each mobile station are received at more than one reception sectors, the upward signals received at more than one reception sectors are despread by using an identical uplink spread code, and a maximal ratio combining of despread upward signals is carried out, in a case of carrying out a simultaneous reception at more than one reception sectors. Also, downward signals are spread by using an identical downlink spread code, and spread downward signals are transmitted from more than one transmission sectors to each mobile station, in a case of carrying out a simultaneous transmission from more than one transmission sectors.

30 Claims, 23 Drawing Sheets

FIG.15

| SECTOR NUMBER | PERCH CHANNEL DATA | SECTOR NUMBER | PERCH CHANNEL DATA |
|---|---|---|---|

FIG.16

| SECTOR NUMBER | COMMUNICATION DATA | SECTOR NUMBER | COMMUNICATION DATA |
|---|---|---|---|

PERCH CHANNEL

SECTOR-1  SECTOR-2  SECTOR-3

(COMMUNICATION CHANNEL)

SECTOR-1   SECTOR-2   SECTOR-3

CDMA MOBILE COMMUNICATION SCHEME WITH EFFECTIVE USE OF SECTOR CONFIGURATION

BACKGROUND OF THE INVENTION

1. Field of the Invention

The present invention relates to a CDMA (Code Division Multiple Access) mobile communication system having base stations connected to a communication network and mobile stations for carrying out communications with the base stations in the CDMA scheme, where each base station has a plurality of sectors dividing the cell of each base station. More specifically, the present invention relates to a spread code utilization scheme, a sector selection scheme, and a transmission power control scheme for this type of CDMA mobile communication system with sector configuration.

2. Description of the Background Art

The CDMA mobile communication system is a system which uses the CDMA scheme, which is one of the spectrum spread scheme, as a radio access scheme between the base stations and the mobile stations.

In the CDMA scheme, a plurality of channels (mobile stations) uses the identical frequency, so that transmission data sequences of different channels are multiplied by different spread codes having low correlations with each other and then multiplexed, so as to make each channel identifiable. In multiplying the spread code, the spread code with a rate (chip rate) faster than the data rate of the data sequence to be spread is used (usually, the PN sequence with a rate faster than the user data by several hundreds to several thousands times is used). By spreading with the spread code of higher chip rate, the transmission bandwidth can be made wider. When the transmission bandwidth becomes wider, the tolerable interference level becomes higher and a number of channels that can carry out communications simultaneously can be increased. At the receiving side, only the desired signals are put back into original waveforms by carrying out the despreading for multiplying the same spread code to the received data sequence. FIG. 26 shows an exemplary change of the waveform (frequency region) in the spectrum spread scheme.

In the CDMA scheme, the other channels cause the identical frequency interference, so that there is the so called Near/Far problem in which a channel transmitted by a mobile station near the base station causes a very large interference with respect to a channel transmitted by another mobile station far from the base station. Consequently, in order to carry out communications for more channels by using a limited bandwidth, that is, in order to increase the capacity, there is a need for a high precision transmission power control which can satisfy the required quality and make the transmission power small.

On the other hand, the soft handover is an important technique in the CDMA scheme. The soft handover is a technique for simultaneously connecting radio channels between a mobile station and a plurality of base stations (sites) when the mobile station moves from one base station to another. By connecting a plurality of radio channels simultaneously, the site diversity composition gain can be obtained so that the transmission power can be lowered and the interference can be reduced.

The sector configuration of a cell is also effective in increasing the capacity. lyhen the sector configuration is used, the interference can be reduced so that the capacity can be increased as much. In a case of the FDMA scheme, the sector configuration has been utilized in order to increase the capacity by shortening the frequency reuse distance, but in a case of the CDMA scheme, the capacity can be increased as much as the interference is reduced by the use of the sector configuration ALso, in a case of using the site diversity among sectors, it is easier to realize the maximal ratio combining compared with a case of using the site diversity among cells, so that the higher composition gain can be obtained. For these reasons, it can be said that the sector configuration is more effective for the CDMA scheme than the FDMA scheme.

Conventionally, the cell/sector judgement for the handover operation has been carried out at the mobile station side in order to reduce the control load on the base station side. In a case of using the CDMA scheme, the mobile station makes the cell/sector judgement by using codes because the neighboring cells/sectors use the identical frequency. Namely, the mobile station scans the spread codes which are specified in advance as the perch channels of the cells/sectors, and makes the cell/sector judgement by comparing the receiving levels of the perch channels after the despreading. From a point of view of shortening the scan time of the mobile station required at a time of turning the power on, it is preferable to use a smaller number of perch channel spread codes, so that the same set of perch channel spread codes are usually arranged repeatedly for reuse.

However, in the conventional CDMA mobile communication system, different perch channel spread codes are assigned to different sectors, so that a required number of perch channel spread codes increases when a number of sectors is increased, and there has been a problem that the correlation characteristic of the perch channel spread codes becomes poor when a number of codes with a good correlation characteristic is limited.

In addition, there has been a problem that the scan time at the mobile station becomes longer when a number of perch channel spread codes is increased.

Moreover, in the conventional CDMA mobile communication system, there has been a problem in that, when a number of sectors is increased, a frequency of the handovers among the sectors also increases, so that the exchange of control signals between the mobile station and the base stations is more frequently required and the control signal traffic is jammed.

Furthermore, in the conventional CDMA mobile communication system, a number of sectors used has been about three, but in conjunction with an increase of users it is expected that a number of sectors used in a future CDMA mobile communication system will be increased to about twelve or more, so that the above noted problems related to the increase of a number of sectors are expected to become more serious.

SUMMARY OF THE INVENTION

It is therefore an object of the present invention to provide a CDINA mobile communication scheme capable of increasing a number of sectors while not increasing a number of perch channel spread codes and not jamming the control channel traffic, so as to obtain the capacity increase effect by the use of the sector configuration effectively.

According to one aspect of the present invention there is provided a method of mobile communication in a CDMA mobile communication system including a base station connected to a communication network and mobile stations for carrying out communications in a CDMA scheme with the base station, the base station having a plurality of sectors dividing a cell of the base station, the method comprising the steps of: transmitting a perch channel spread by an identical perch channel spread code assigned to the base station from each one of at least two sectors of the base station; receiving upward signals from each mobile station at more than one reception sectors, despreading the upward signals received at said more than one reception sectors by using an identical uplink spread code, and carrying out a maximal ratio combining of despread upward signals, in a case of carrying out a simultaneous reception at said more than one reception sectors; and spreading downward signals by using an identical downlink spread code, and transmitting spread downward signals from more than one transmission sectors to each mobile station, in a case of carrying out a simultaneous transmission from said more than one transmission sectors.

According to another aspect of the present invention there is provided a base station apparatus for use in a CDMA mobile communication system including a base station connected to a communication network and mobile stations for carrying out communications in a CDMA scheme with the base station, the base station having a plurality of sectors dividing a cell of the base station, the base station apparatus comprising: a perch channel transmission device for transmitting a perch channel spread by an identical perch channel spread code assigned to the base station from each one of at least two sectors of the base station; a communication channel reception device for receiving upward signals from each mobile station at more than one reception sectors, despreading the upward signals received at said more than one reception sectors by using an identical uplink spread code, and carrying out a maximal ratio combining of despread upward signals, in a case of carrying out a simultaneous reception at said more than one reception sectors; and a communication channel transmission device for spreading downward signals by using an identical downlink spread code, and transmitting spread downward signals from more than one transmission sectors to each mobile station, in a case of carrying out a simultaneous transmission from said more than one transmission sectors.

According to another aspect of the present invention there is provided a mobile station apparatus for use in a CDMA mobile communication system including a base station connected to a communication network and mobile stations for carrying out communications in a CDMA scheme with the base station, wherein the base station has a plurality of sectors dividing a cell of the base station, the base station transmits a perch channel spread by an identical perch channel spread code assigned to the base station from each one of at least two sectors of the base station, and the perch channel transmitted from each sector contains a sector information for identifying each sector, the mobile station apparatus of each mobile station comprising: a perch channel reception device for receiving the perch channel transmitted from each sector and selecting one transmission sector for transmitting the downward signals to said mobile station apparatus according to the perch channel transmitted from each sector; a communication channel reception device for receiving downward signals transmitted from the base station; and a communication channel transmission device for transmitting upward signals to the base station, the upward signals containing a portion for notifying said one transmission sector to the base station by using the sector information contained in the perch channel transmitted from each sector, so that the base station carries out a transmission from said one transmission sector notified from said mobile station apparatus.

According to another aspect of the present invention there is provided a mobile station apparatus for use in a CDMA mobile communication system including a base station connected to a communication network and mobile stations for carrying out communications in a CDMA scheme with the base station, wherein the base station has a plurality of sectors dividing a cell of the base station, the base station transmits a perch channel spread by an identical perch channel spread code assigned to the base station from each one of at least two sectors of the base station, and the base station transmits downward signals from different sectors through communication channels at different timings with respect to a transmission timing of the perch channel, the mobile station apparatus of each mobile station comprising: a perch channel reception device for receiving the perch channel transmitted from each sector; a communication channel reception device for receiving the downward signals transmitted from the base station, identifying each sector from which the downward signals are currently received according to a difference between a receiving timing of the perch channel and a receiving timing of each communication channel, and measuring a receiving level of a communication channel for each identified sector; and a communication channel transmission device for transmitting upward signals to the base station, the upward signals containing a portion for notifying each identified sector and a measured receiving level for each identified sector to the base station, so that the base station selects at least one transmission sector for transmitting the downward signals to said mobile station apparatus according to the measured receiving level for each identified sector notified from said mobile station apparatus.

Other features and advantages of the present invention will become apparent from the following description taken in conjunction with the accompanying drawings.

BRIEF DESCRIPTION OF THE DRAWINGS

FIG. 15 is a diagram showing a configuration of a perch channel according to the ninth embodiment of the present invention.

FIG. 16 is a diagram showing a configuration of a communication channel according to the ninth embodiment of the present invention.

DETAILED DESCRIPTION OF THE PREFERRED EMBODIMENTS

Referring now to FIG. 1 to FIG. 5, the first embodiment of a CDMA mobile communication scheme according to the present invention will be described in detail.

Figure 1:
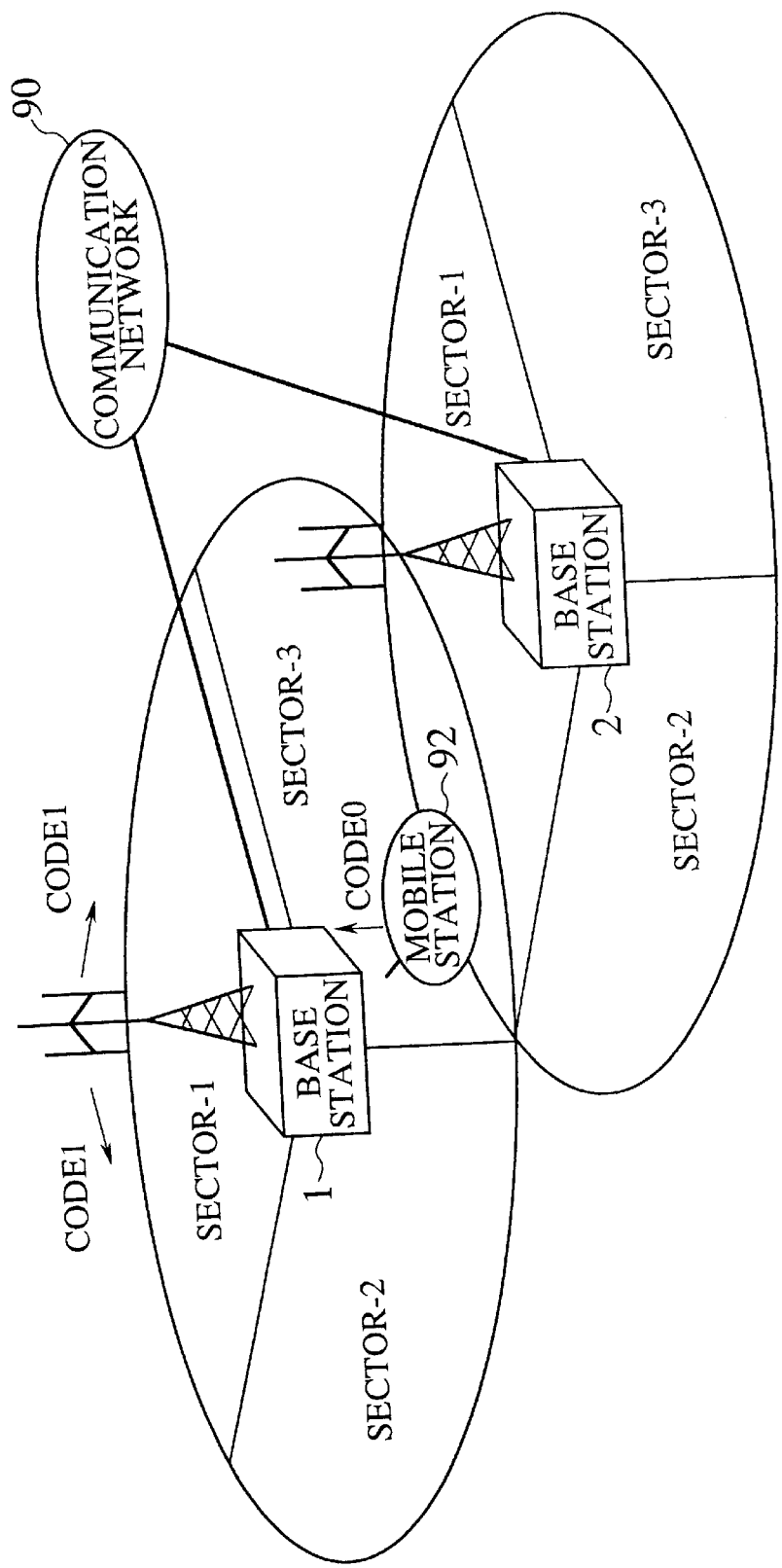
FIG. 1 is a schematic block diagram of a CDMA mobile communication system according to the present invention.

FIG. 1 shows a configuration of a CDMA mobile communication system in this first embodiment, in which each one of base stations 1 and 2 connected to a communication network 90 is formed by a plurality of sectors (three sectors of sector-1 to sector-3 in this first embodiment), and each base station 1 or 2 is transmitting a perch channel using a spread code assigned to each base station in advance from these sector-1 to sector-3. Also, in FIG. 1, a mobile station 92 is carrying out a communication with the base station 1. The mobile station 92 is transmitting an uplink spread code (code0) with respect to the base station 1, and the base station 1 is transmitting the same downlink spread code (code1) from the sector-2 and the sector-3 with respect to the mobile station 92.

Figure 2:
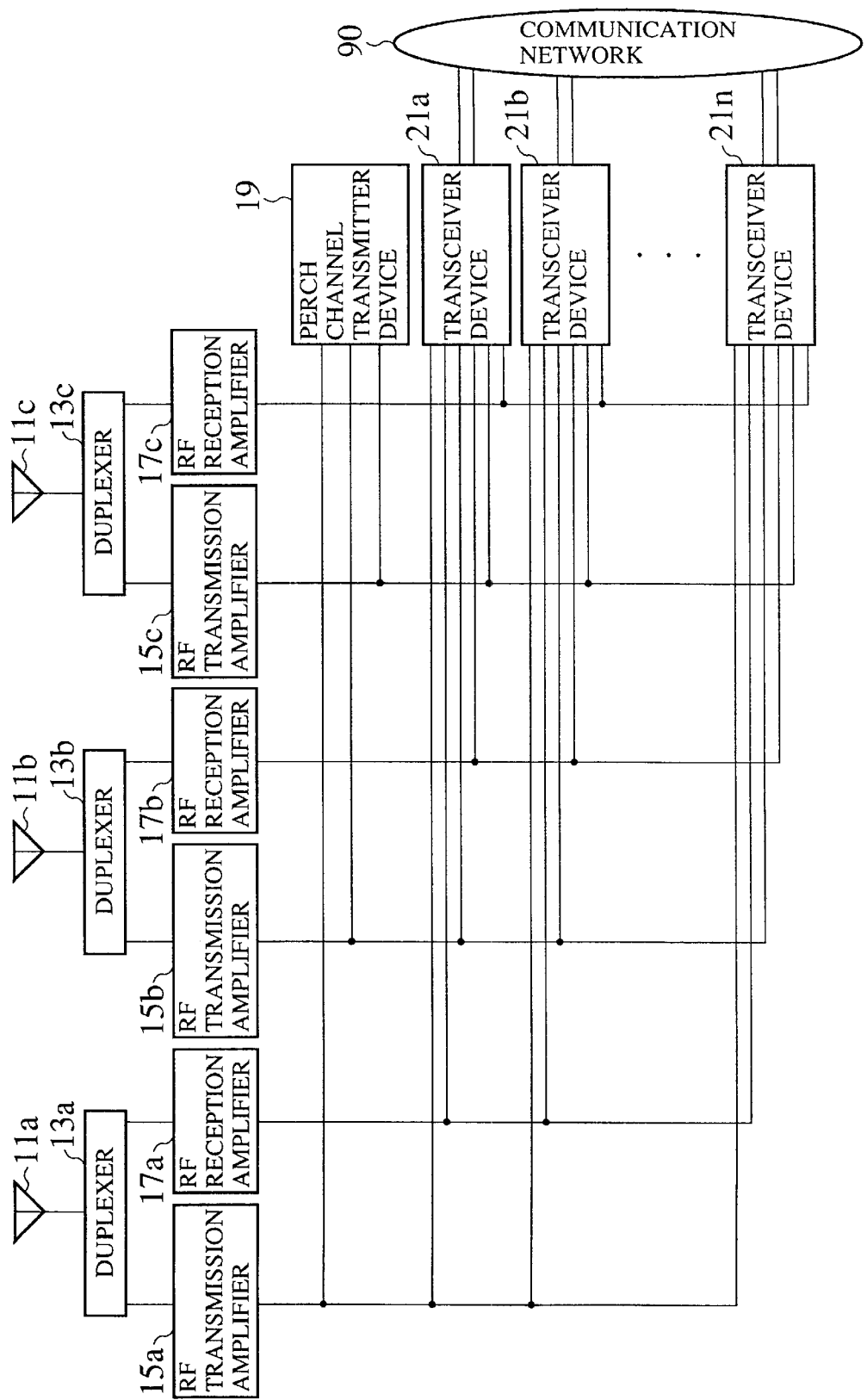
FIG. 2 is a block diagram of each base station in the system of FIG. 1 according to the first embodiment of the present invention.

FIG. 2 shows a configuration of each base station 1 or 2 in the CDMA mobile communication system of FIG. 1. As shown in FIG. 2, each base station has an antenna 11a for the sector-1, an antenna 11b for the sector-2, and an antenna 11c for the sector 3, which are used for transmission and reception of radio signals for each sector. These antennas 11a, 11b and 11c are connected with duplexers 13a, 13b and 13c, respectively, so that each antenna is used for both transmission and reception. These duplexers 13a, 13b and 13c are connected with RF transmission amplifiers 15a, 15b and 15c, and RF reception amplifiers 17a, 17b and 17c, respectively, where each RF transmission amplifier 15 amplifies transmission signals in the RF bandwidth, and each RF reception amplifier 17 amplifies received signals in the RF bandwidth.

Each RF transmission amplifier 15 is connected with a perch channel transmitter device 19 for transmitting the perch channel, while each RF transmission amplifier 15 and each RF reception amplifier 17 are connected with a plurality of transceiver devices 21a, 21b, ..., 21n which are provided in correspondence to communication channels and used for carrying out communications with a plurality of mobile stations simultaneously. These plurality of transceiver devices 21 are connected with correspondent transceiver devices (not shown) through the communication network 90.

Figure 3:
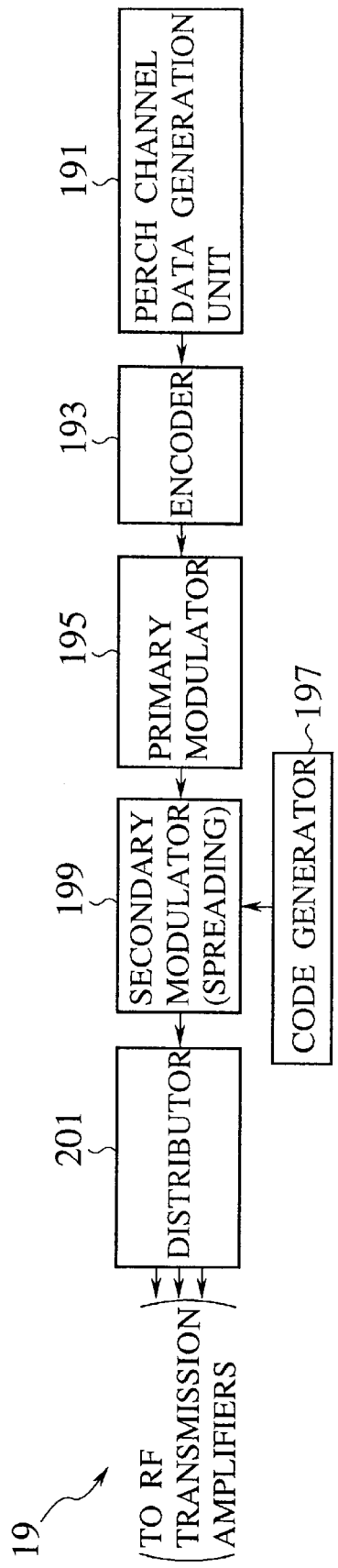
FIG. 3 is a block diagram of a perch channel transmitter device in the base station of FIG. 2 according to the first embodiment of the present invention.

FIG. 3 shows a configuration of the perch channel transmitter device 19 in the base station of FIG. 2. As shown in FIG. 3, the perch channel transmitter device 19 has a perch channel data generation unit 19 for generating data to be transmitted through the perch channel. The data generated by the perch channel data generation unit 191 are then encoded by an encoder 193, applied with a primary modulation by a primary modulator 195, and supplied to a secondary modulator 199. There is also provided a code generator 197 for generating a perch channel spread code assigned to each base station in advance, and supplying the generated perch channel spread code to the secondary modulator 199. The secondary modulator 199 applies the secondary modulation, i.e., the spreading, to the primary modulated data supplied from the primary modulator 195, using the perch channel spread code supplied from the code generator 197. The spread data obtained by the secondary modulator 199 are then distributed to the RF transmission amplifiers 15 of three sectors by a distributor 201.

Figure 4:
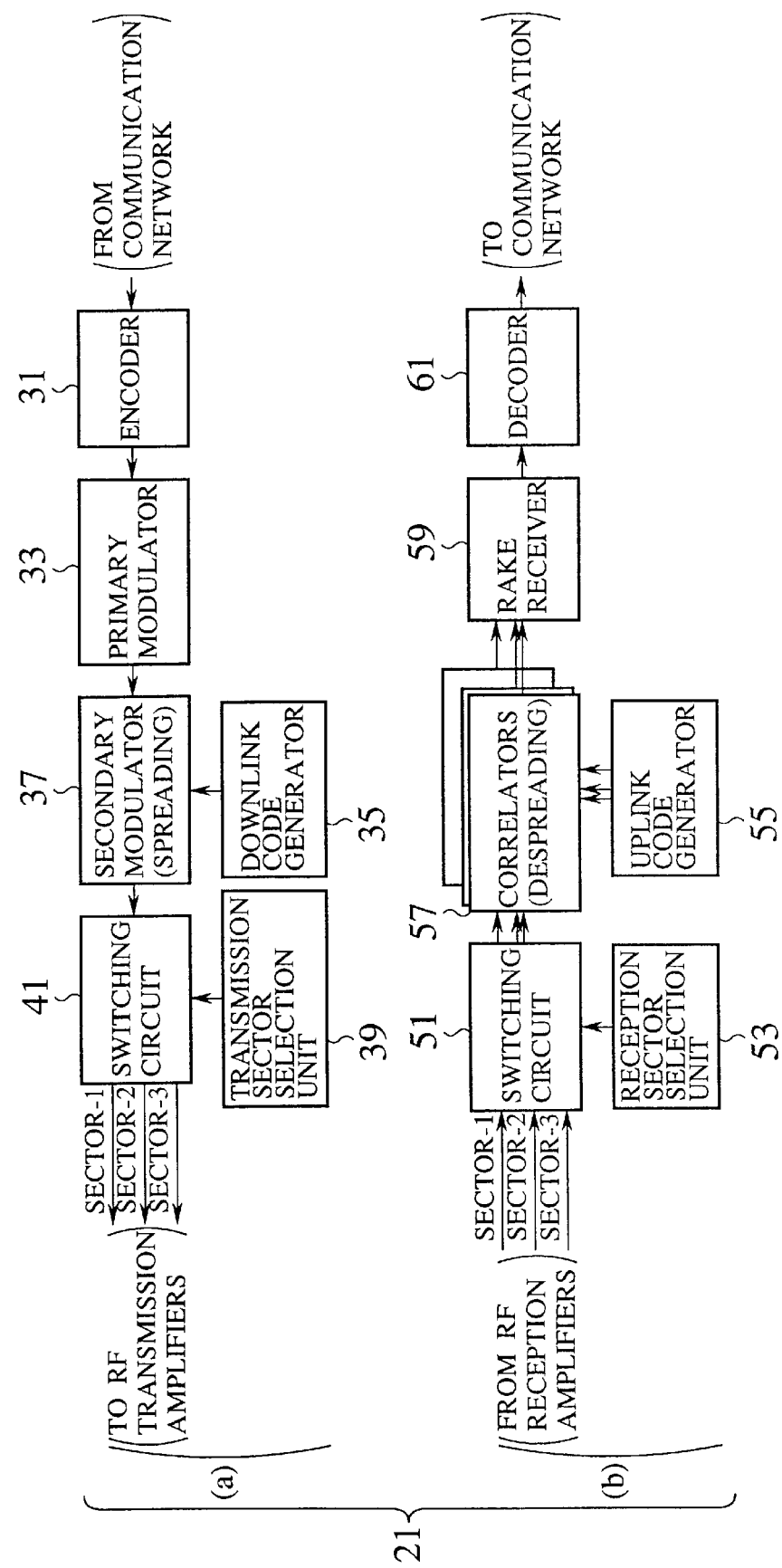
FIG. 4 is a block diagram of each transceiver device in the base station of FIG. 2 according to the first embodiment of the present invention.

FIG. 4 shows a configuration of each transceiver device 21 in the base station of FIG. 1, where a part (a) is a transmission section and a part (b) is a reception section.

In the transmission section of a part (a) of FIG. 4, communication data transmitted from the communication network 90 are encoded by an encoder 31, applied with a primary modulation by a primary modulator 33, and supplied to a secondary modulator 37. There is also provided a downlink code generator 35 for generating a downlink communication spread code assigned to each mobile station, that is, each communication channel, in advance, and supplying the generated downlink communication spread code to the secondary modulator 37.

The secondary modulator 37 applies the secondary modulation, i.e., the spreading, to the primary modulated data supplied from the primary modulator 33, using the downlink communication spread code supplied from the downlink code generator 35. The spread data obtained by the secondary modulator 37 are then supplied to a switching circuit 41. There is also provided a transmission sector selection unit 39 which has a function for selecting a sector for transmitting the communication data. Here, one or more sectors may be selected by the transmission sector selection unit 39. The switching circuit 41 carries out the switching of secondary modulated data from the secondary modulator 37 according to a selection result obtained by the transmission sector selection unit 39, so as to control a supply of the communication data to the RF transmission amplifier 15 of the selected sector.

In the reception section of a part (b) of FIG. 4, there is provide a reception sector selection unit 53 which has a function for selecting a sector for receiving the communication data. Here, one or more sectors may be selected by the reception sector selection unit 53. There is also provided a switching circuit 51 which supplies the received signals from the RF reception amplifier 17 of the selected sector to correlators 57, according to a selection result obtained by the reception sector selection unit 53. There is also provided an uplink code generator 55 for generating an uplink communication spread code assigned to each mobile station, that is, each communication channel, in advance, and supplying the generated uplink communication spread code to the correlators 57.

Each correlator 57 despreads the received signals supplied from the switching circuit 51, using the uplink communication spread code supplied from the uplink code generator 55. Here, a number of the correlators 57 to be provided is dependent on a number of receiving branches of a RAKE receiver 59, and it is assumed that a sufficiently many correlators 57 are provided in this first embodiment. In other words, the transceiver device 21 of FIG. 4 is assumed to have a configuration capable of receiving signals from all valid paths. The RAKE receiver 59 carries out the maximal ratio combining of outputs of the correlators 57, which is then decoded by a decoder 61, and decoded signals are transmitted to the communication network 90.

Figure 5:
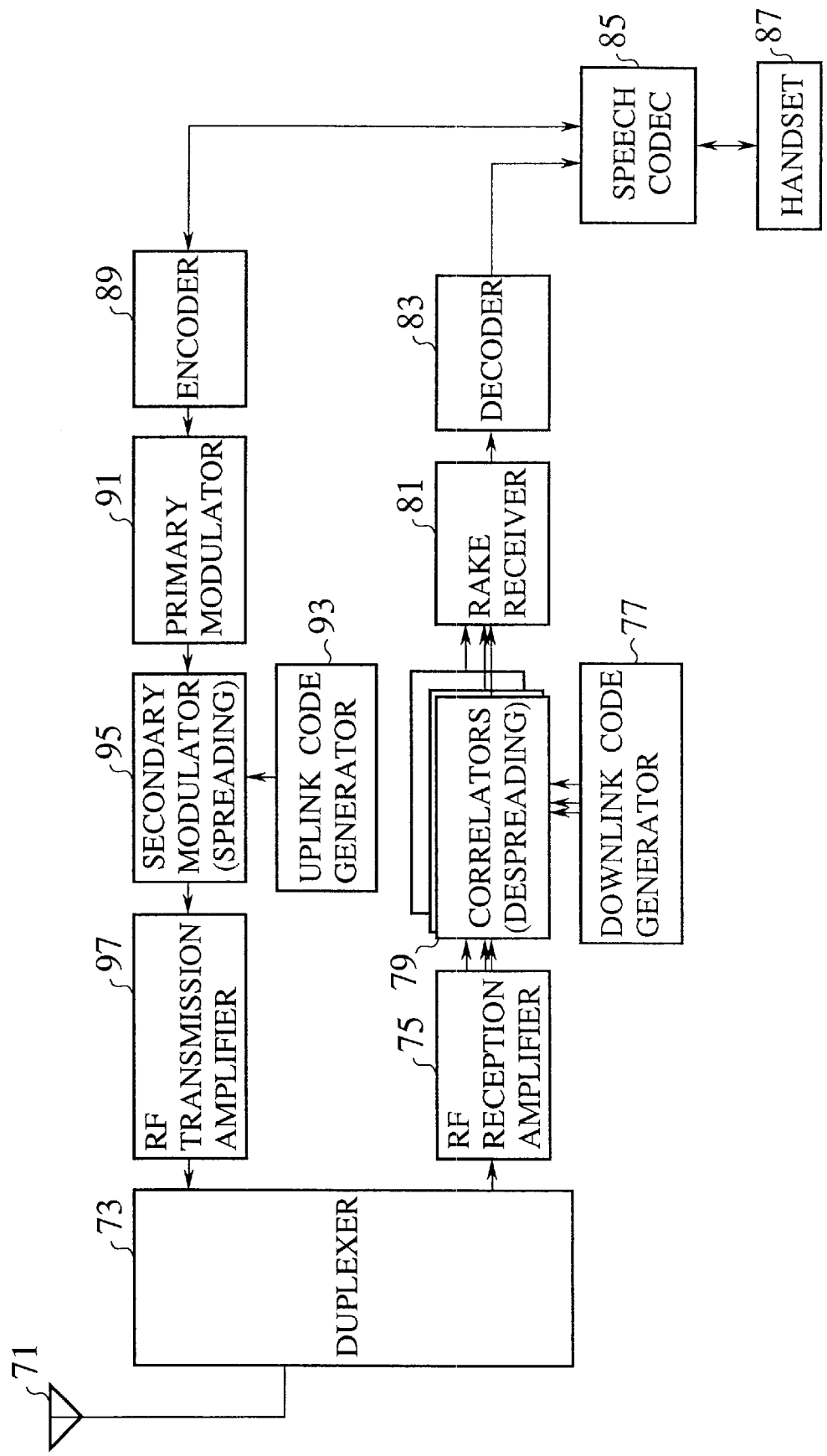
FIG. 5 is a block diagram of a mobile station in the system of FIG. 1 according to the first embodiment of the present invention.

FIG. 5 shows a configuration of each mobile station in the CDMA mobile communication system of FIG. 1. As shown in FIG. 5, each mobile station has an antenna 71 for transmitting and receiving radio signals with respect to the base stations, and signals received from the base stations by the antenna 71 are supplied to an RF reception amplifier 75 through a duplexer 73, and amplified and supplied to correlators 79 at the RF reception amplifier 75. There is also provided a downlink code generator 77 for generating a downlink communication spread code assigned to each mobile station, that is, each communication channel, in advance, and supplying the generated downlink communication spread code to the correlators 79.

Each correlator 79 despreads the received signals supplied from the RF reception amplifier 75, using the downlink communication spread code supplied from the downlink code generator 77. Here, a number of the correlators 79 to be provided is dependent on a number of receiving branches of a RAKE receiver 81, and it is assumed that a sufficiently many correlators 79 are provided in this first embodiment. In other words, the mobile station of FIG. 5 is assumed to have a configuration capable of receiving signals from all valid paths.

The RAKE receiver 81 carries out the maximal ratio combining of outputs of the correlators 79, which is then decoded by a decoder 83. The decoded signals are then converted from digital signals to speech signals by a speech CODEC 85, and transmitted to a handset 87.

On the other hand, the speech signals entered from the handset 87 are converted into digital signals by the speech CODEC 85, encoded by an encoder 89, applied with a primary modulation by a primary modulator 91, and supplied to a secondary modulator 95. There is also provided an uplink code generator 93 for generating an uplink communication spread code assigned to each mobile station, that is, each communication channel, in advance, and supplying the generated uplink communication spread code to the secondary modulator 95. The secondary modulator 95 applies the secondary modulation, i.e., the spreading, to the primary modulated data supplied from the primary modulator 91, using the uplink communication spread code supplied from the uplink code generator 93. The spread data obtained by the secondary modulator 95 are then supplied to an RF transmission amplifier 97 which amplifies signals in the RF bandwidth, and transmitted from the antenna 71 through the duplexer 73.

In the CDMA mobile communication system with the configuration as described above, each base station generates the perch channel, which is spread by the perch channel spread code assigned to each base station in advance, from the perch channel transmitter device 19. Then, this same perch channel is amplified by the RF transmission amplifiers 15a, 15b and 15c, and transmitted toward three sectors from the antennas 11a, 11b and 11c through the duplexers 13a, 13b and 13c, respectively. Namely, in the CDMA mobile communication system of this first embodiment, the identical perch channel is transmitted to all three sectors, rather than using different perch channels for different sectors as in a conventional system. Then, the sector selection is made by the base station side, so that there is no need to make the selection at the mobile station.

The mobile station receives the perch channels from the base stations by sequentially using the perch channel spread codes of surrounding cells which are stored in a memory, and specifies the base station from the perch channel spread code, but the mobile station does not notice which sector of the base station it is currently located at.

In a case of simultaneously receiving signals from the mobile station at two or more sectors of the base station, the received signals from these two or more sectors are switching controlled by the switching circuit 51 according to the selection control by the reception sector selection unit 53. Then, the received signals from these two or more sectors are despread by using the identical uplink spread code at the correlators 57. Then, their maximal ratio combining is carried out by the RAKE receiver 59, decoded by the decoder 61, and transmitted to the communication network 90.

Also, in a case of simultaneously transmitting signals from two or more sectors of the base station, the transmission signals are spread by using the identical downlink spread code at the secondary modulator 37. Then, the spread transmission signals are switching controlled by the switching circuit 41 according to the selection control by the transmission sector selection unit 39, and transmitted from two or more sectors.

In addition, even when the mobile station moves from one sector to another within the same base station, there is no need to change the uplink spread code and the downlink spread code, so that there is no need to notify the sector selected at the base station to the mobile station, and there is also no need for exchange of control signals related to the sector selection between the mobile station and the base station. As for the capacity, the base station selects the transmission sector and the reception sector, so that the capacity increasing effect due to the sector configuration can be achieved.

Consequently, in comparison with the conventional CDMA mobile communication system, the CDMA mobile communication system of this first embodiment can use the perch channel spread codes with good correlation characteristic even when a number of sectors is increased because a number of perch channels can be reduced, and the accurate cell/sector judgement can be made at the mobile station because the scan time for the purpose of the cell/sector judgement at the mobile station can be short. In addition, there is no exchange of control signals between the mobile station and the base station when the mobile station moves from one sector to another, so that the control traffic will not be jammed even when a number of sectors is increased, and therefore the capacity can be increased by increasing a number of sectors.

Figure 6:
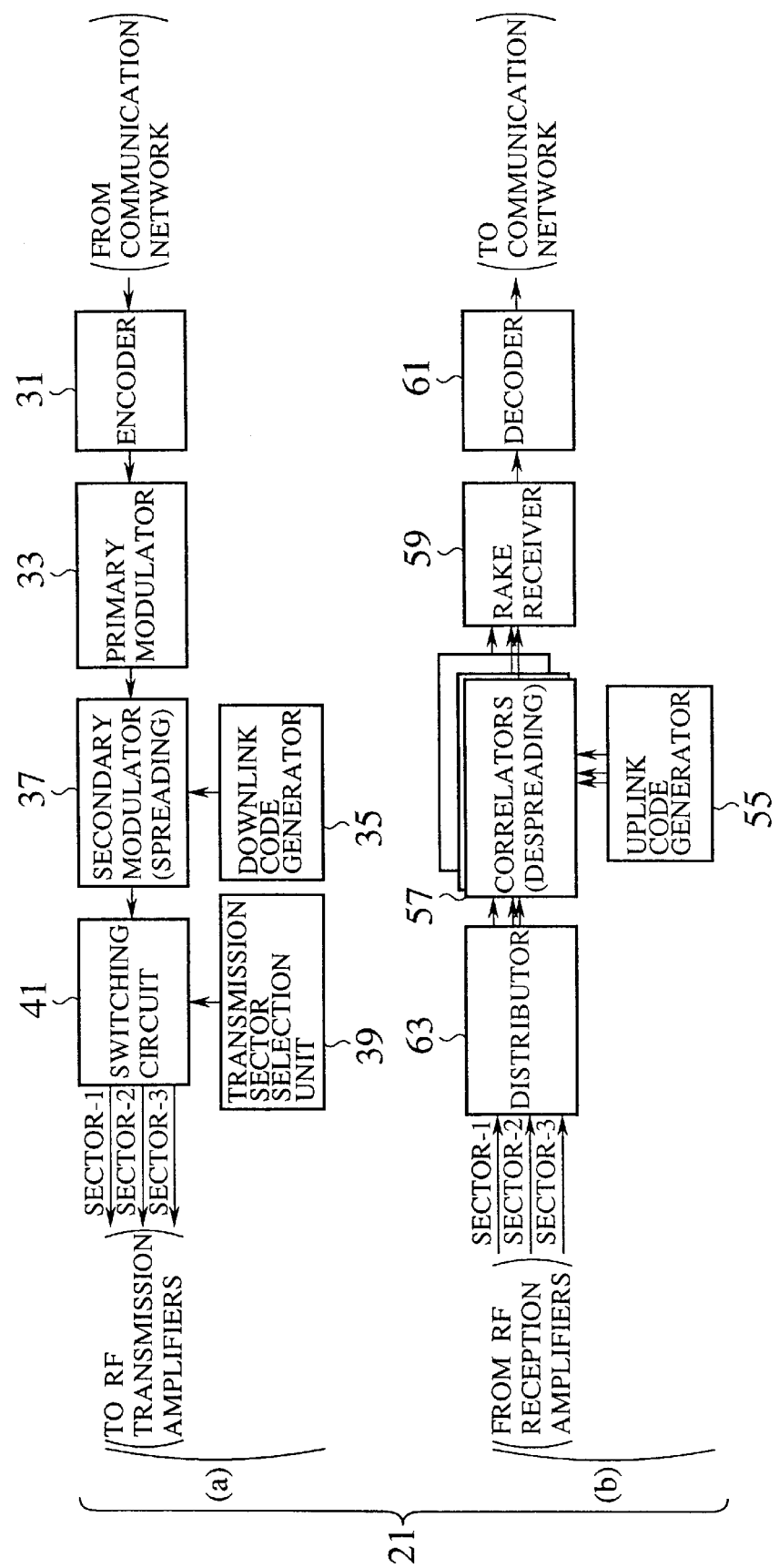
FIG. 6 is a block diagram of each transceiver device in the base station of FIG. 2 according to the second embodiment of the present invention.

Referring now to FIG. 6, the second embodiment of a CDMA mobile communication scheme according to the present invention will be described in detail.

In this second embodiment, the signals from the mobile station are always simultaneously received by all sectors within the same base station, and to this end, a configuration of the transceiver device 21 in each base station is modified as shown in FIG. 6. The rest of the CDMA mobile communication system in this second embodiment is the same as that of the first embodiment.

In this transceiver device 21 of FIG. 6, the transmission section in a part (a) is the same as that of FIG. 4, but the reception section in a part (b) is different from that of FIG. 4 in that a distributor 63 for distributing signals from all sectors is provided instead of the switching circuit 51 and the reception sector selection unit 53. The rest of this configuration of FIG. 6 is the same as that of FIG. 4.

With this configuration, the simultaneous reception of the signals from the mobile station at all the sectors is always realized through the distributor 63, and the signals received by all the sectors are despread by the correlators 57 by using the identical uplink spread code, and their maximal ratio combining is carried out by the RAKE receiver 59.

As should be apparent from FIG. 6, when the simultaneous reception at all the sectors is always realized through the distributor 63, there is no need to make the reception sector selection. As for the capacity, the receiving characteristic for the uplink communication is not degraded when the maximal ratio combining is carried out even in a case of using the simultaneous reception at all the sectors, so that the capacity increasing effect due to the sector configuration can be achieved, and the capacity equivalent or superior to a case of using the configuration of FIG. 4 is guaranteed.

Figure 7:
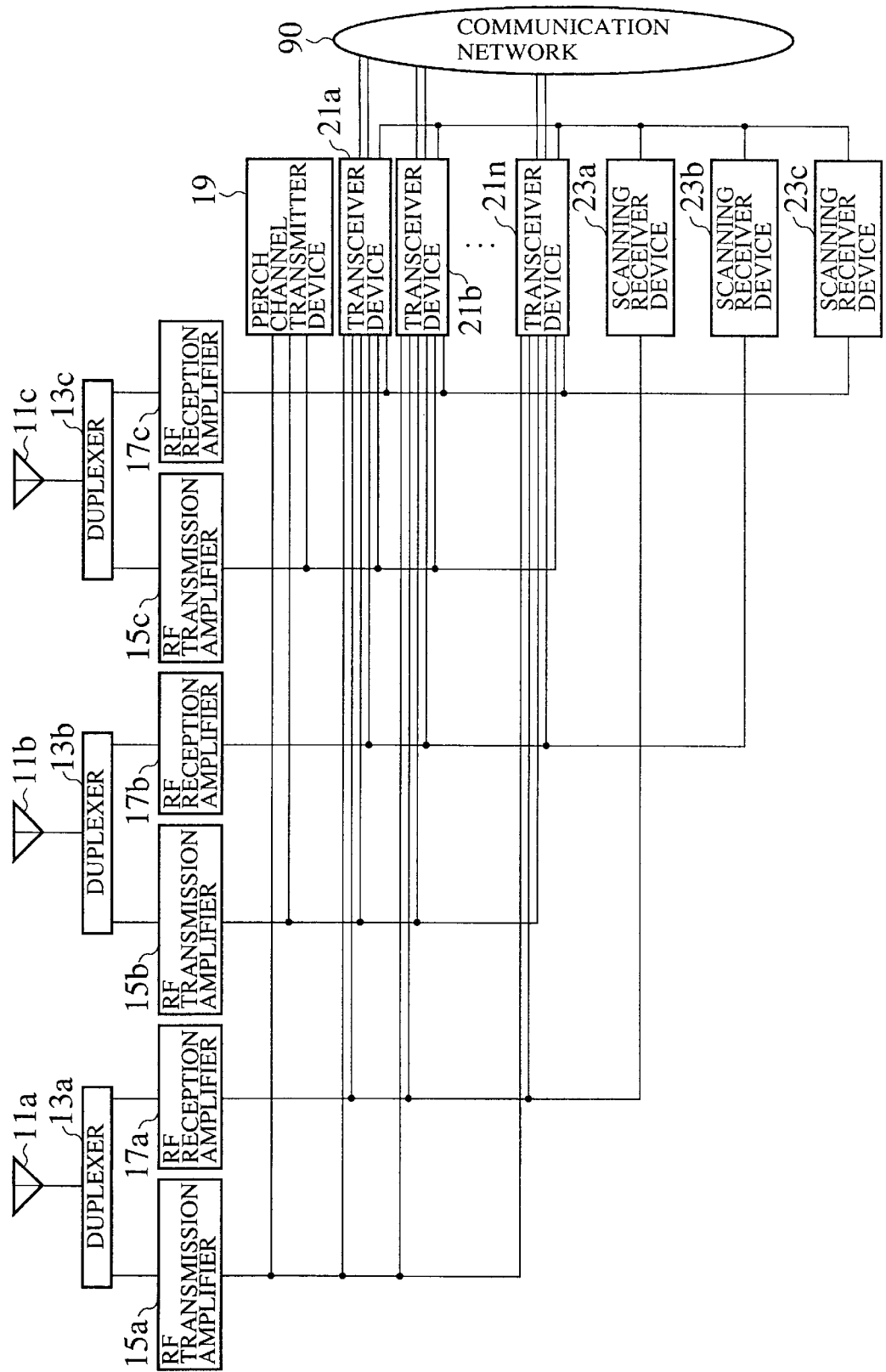
FIG. 7 is a block diagram of each base station in the system of FIG. 1 according to the third embodiment of the present invention.
Figure 8:
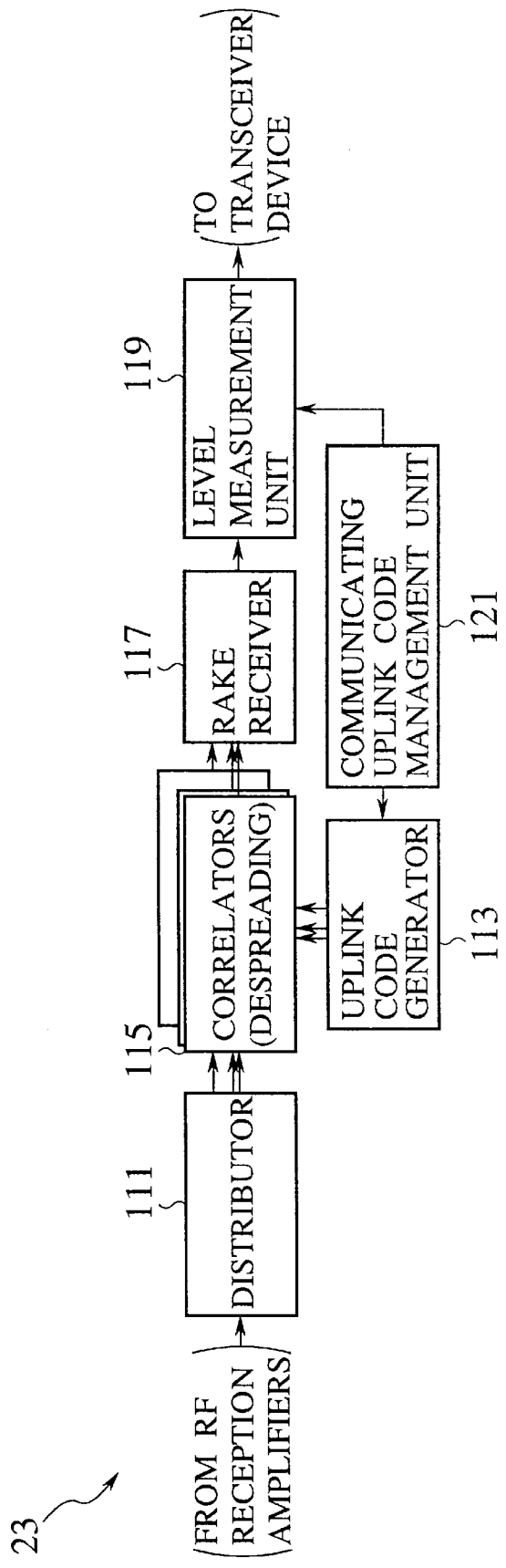
FIG. 8 is a block diagram of each scanning receiver device in the base station of FIG. 7 according to the third embodiment of the present invention.

Referring now to FIG. 7 and FIG. 8, the third embodiment of a CDMA mobile communication scheme according to the present invention will be described in detail.

In this third embodiment, the reception sector selection is made by providing a scanning receiver devices for each sector, and to this end, a configuration of each base station is modified as shown in FIG. 7. The rest of the CDMA mobile communication system in this third embodiment is the same as that of the first embodiment.

The base station of FIG. 7 has scanning receiver devices 23a, 23b and 23c which are provided in correspondence to three sectors and connected with the RF reception amplifiers 17a, 17b and 17c for the respective sectors, respectively. The rest of this configuration of FIG. 7 is the same as that of FIG. 2.

FIG. 8 shows a configuration of each scanning receiver device 23. As shown in FIG. 8, each scanning receiver device 23 has a distributor 111 for distributing signals transmitted from the RF reception amplifier 17 of the corresponding sector, and signals distributed by the distributor 111 are supplied to correlators 115. There is also provided a communicating uplink code management unit 121 which stores the uplink spread codes assigned to all the mobile stations which are currently communicating with this base station, and manages a correspondence between each stored uplink spread code and the transceiver device 21 used for that uplink spread code.

The communicating uplink code management unit 121 sequentially notifies the stored uplink spread codes to an uplink code generator 113, and the uplink code generator 113 generates the notified uplink spread code and supplies the generated uplink spread code to the correlators 115. The correlators 115 despread the signals from the distributor 111 using the uplink spread code supplied from the uplink code generator 113, and the despread signals are received by a RAKE receiver 117.

There is also provided a level measurement unit 119 for measuring a receiving level at the RAKE receiver 117, which reports the measurement result to the reception sector selection unit 53 of the transceiver device 21 specified by the communicating uplink code management unit 121. This reception sector selection unit 53 then makes the reception sector selection by comparing receiving levels reported from all the sectors. Here, the sector with the largest receiving level can be selected as the reception sector, or the sector for which a difference between the maximum receiving level and the measured receiving level is not greater than a prescribed value, such as 5 dB for example, can be selected as the reception sector.

By providing the scanning receiver device 23 for each sector, and selecting the uplink reception sector as described above, there is no need to select all the sector all the times so that the receiver resources in the base station can be saved. In addition, only one scanning receiver device 23 is required for each sector, so that the utilization efficiency of the scanning receiver device 23 is also high.

Figure 9:
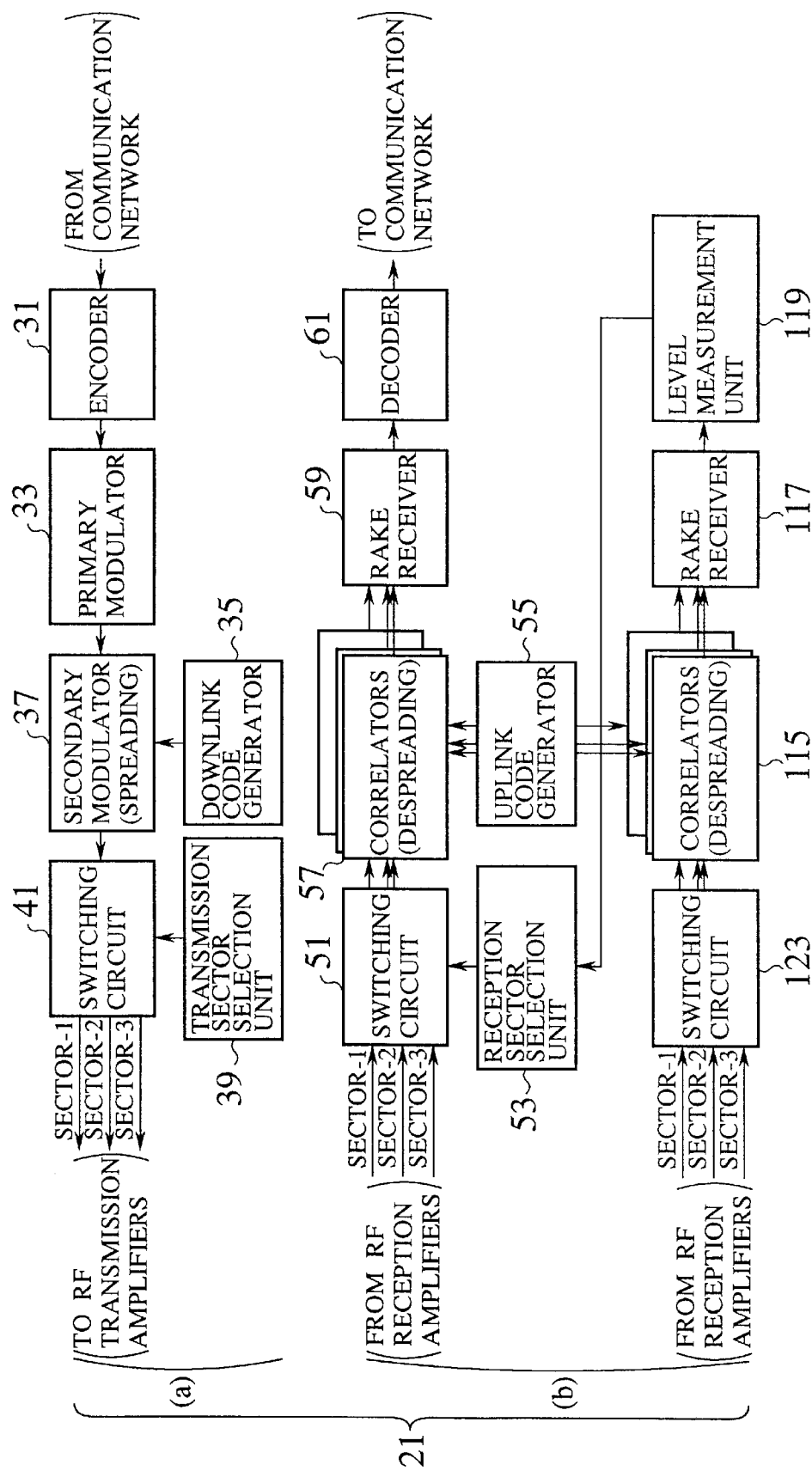
FIG. 9 is a block diagram of each transceiver device in the base station of FIG. 2 according to the fourth embodiment of the present invention.

Referring now to FIG. 9, the fourth embodiment of a CDMA mobile communication scheme according to the present invention will be described in detail.

In this fourth embodiment, the scanning receiver unit is provided in each transceiver device 21, so that a configuration of the transceiver device 21 in each base station is modified as shown in FIG. 9. The rest of the CDMA mobile communication system in this fourth embodiment is the same as that of the first embodiment.

In this transceiver device 21 of FIG. 9, the transmission section in a part (a) is the same as that of FIG. 4, but the reception section in a part (b) is different from that of FIG. 4 in that the scanning receiver unit formed by a switching circuit 123, correlators 115, a RAKE receiver 117, and a level measurement unit 119 is additionally provided, where the correlators 115 are connected with the uplink code generator 55 and the level measurement unit 119 is connected with the reception sector selection unit 53. The rest of this configuration of FIG. 9 is the same as that of FIG. 4.

In the scanning receiver unit of the transceiver device 21 shown in FIG. 9, the switching circuit 123 is controlled to sequentially transmit signals from the RF reception amplifiers 17 of all the sectors to the correlators 115. For example, the switching in a manner of sector-1→sector-2→sector-3 is made at a prescribed time interval. Note that, for the sector selected by the reception sector selection unit 53, the receiving level measurement may be made by using the usual reception section of FIG. 4, so that the scanning by the scanning receiver unit may be made only over those sectors which are not selected by the reception sector selection unit 53.

The correlators 115 despread the signals from the switching circuit 123 using the uplink spread code generated by the uplink code generator 55 of the usual reception section of FIG. 4, and the despread signals are received by the RAKE receiver 117.

The level measurement unit 119 measures a receiving level at the RAKE receiver 117, and supplies the measurement result to the reception sector selection unit 53. At the same time, the reception sector selection unit 53 can learn the currently receiving sector from the switching circuit 51, so that the reception sector selection unit 53 can comprehend the relationship between the reception sector and the receiving level. The reception sector selection unit 53 then makes the reception sector selection by comparing receiving levels reported from all the sectors. Here, the sector with the largest receiving level can be selected as the reception sector, or the sector for which a difference between the maximum receiving level and the measured receiving level is not greater than a prescribed value, such as 5 dB for example, can be selected as the reception sector.

By providing the scanning receiver unit in each transceiver device 21, and selecting the uplink reception sector as described above, there is no need to select all the sector all the times so that the receiver resources in the base station can be saved. In addition, the receiver for level scanning is provided in correspondence to each mobile station, so that it is possible to improve the sector selection precision.

Figure 10:
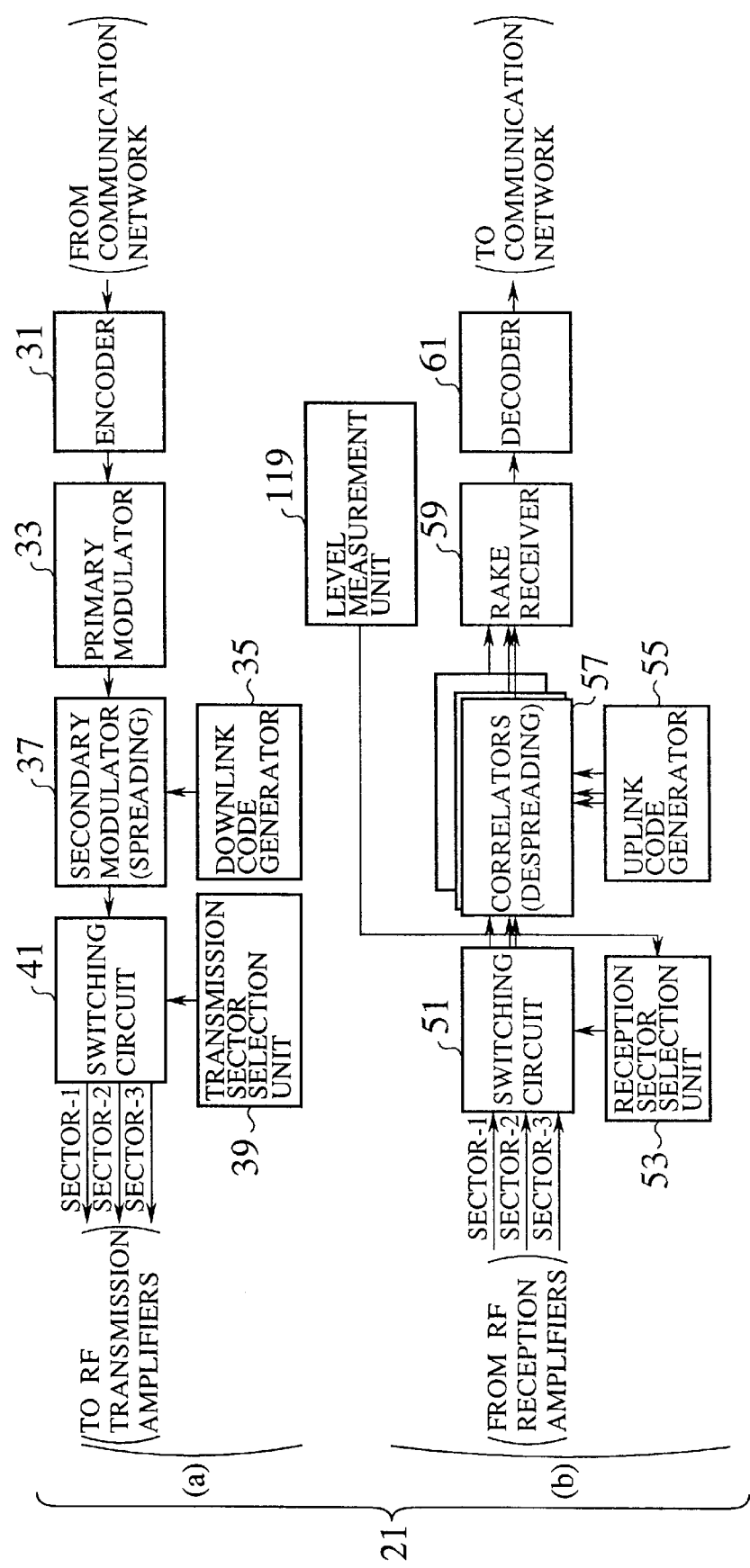
FIG. 10 is a block diagram of each transceiver device in the base station of FIG. 2 according to the fifth embodiment of the present invention.
Figure 11:
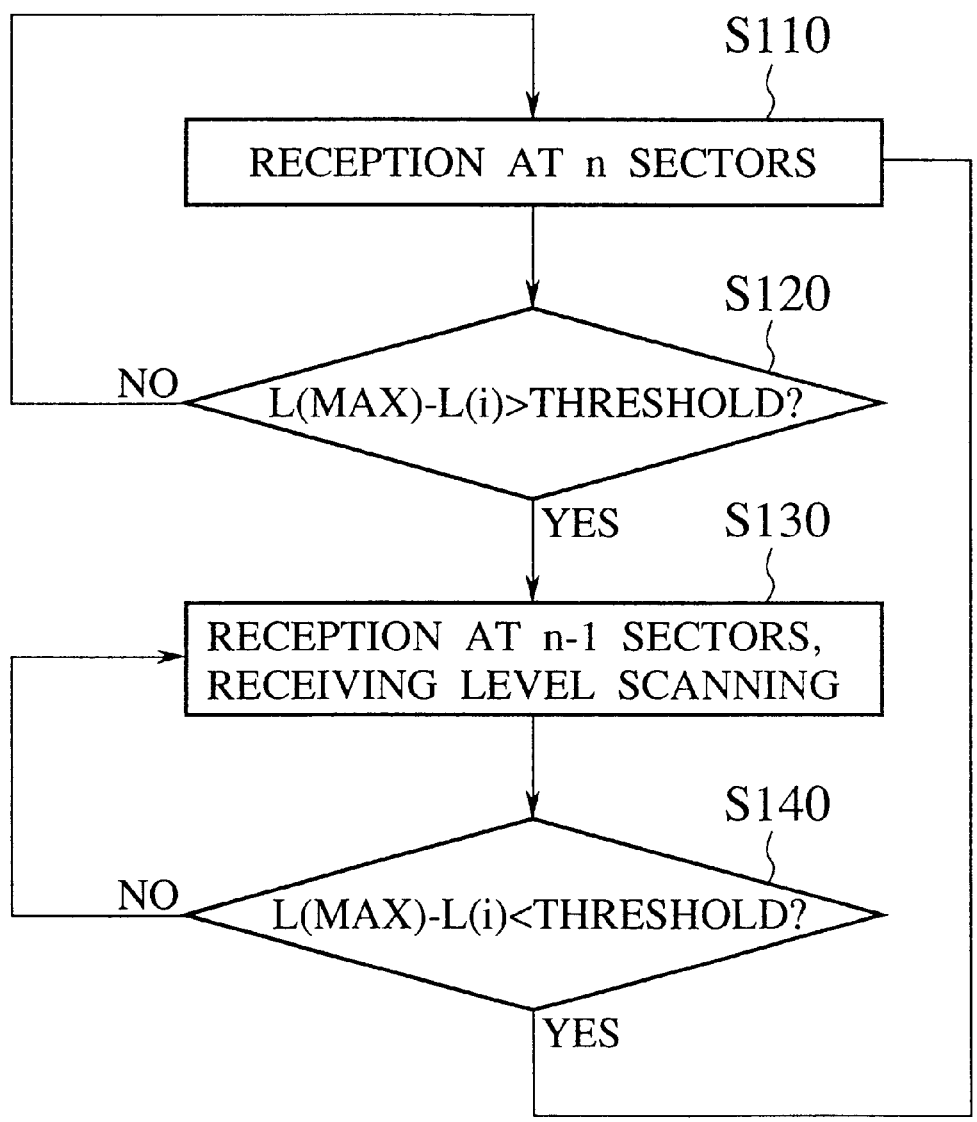
FIG. 11 is a flow chart for an operation of a reception sector selection unit in the transceiver device of FIG. 10 according to the fifth embodiment of the present invention.

Referring now to FIG. 10 and FIG. 11, the fifth embodiment of a CDMA mobile communication scheme according to the present invention will be described in detail.

In this fifth embodiment, the scanning receiver unit of FIG. 9 and the usual reception section of FIG. 4 are realized by an integral configuration, so that a configuration of the transceiver device 21 in each base station is modified as shown in FIG. 10. The rest of the CDMA mobile communication system in this fifth embodiment is the same as that of the first embodiment.

In this transceiver device 21 of FIG. 10, the transmission section in a part (a) is the same as that of FIG. 4, but the reception section in a part (b) is different from that of FIG. 4 in that the level measurement unit 119 connected with the reception sector selection unit 53 and the RAKE receiver 59 is additionally provided. The rest of this configuration of FIG. 10 is the same as that of FIG. 4.

In the level measurement unit 119 of the transceiver device 21 shown in FIG. 10, the receiving level of each currently receiving sector at the RAKE receiver 59 is measured, and the measurement result is notified to the reception sector selection unit 53. Then, at the reception sector selection unit 53, the control by the algorithm shown in FIG. 11 is carried out, according to the notified level measurement result.

In the algorithm shown in FIG. 11, the maximum number of reception sectors is set to n, and L(MAX) denotes the receiving level of the sector with the largest receiving level, while L(i) denotes the receiving level of the i-th sector.

In FIG. 11, while the reception at n sectors is carried out (step S110), whether a difference between the largest receiving level L(MAX) of the largest receiving level sector and the receiving level L(i) of the i-th sector is greater than a prescribed threshold (such as 5 dB) or not is checked according to the level measurement result (step S120). The reception at n sectors is continued when L(MAX)–L(i) is not greater than the prescribed threshold. On the other hand, when L(MAX)–L(i) is greater than the prescribed threshold, a number of reception sectors is reduced to n–1, and the receiving level scanning for these n–1 sectors is carried out (step S130). Then, while the reception at n–1 sectors is carried out, whether a difference between the largest receiving level L(MAX) of the largest receiving level sector and the receiving level L(i) of the i-th sector is less than a prescribed threshold (such as 5 dB) or not is checked according to the level measurement result (step S140). The reception at n–1 sectors is continued when L(MAX)–L(i) is not less than the prescribed threshold. On the other hand, when L(MAX)–L(i) is less than the prescribed threshold, the operation returns to the step S110 at which a number of reception sectors is increased to n so that the reception at n sectors is carried out.

While the simultaneous reception at a plurality of sectors is carried out, the switching of the reception sector becomes necessary when the mobile station moves to the sector which has not been carrying out the reception. In such a case, the receiving level of some sector which is currently carrying out the reception will be degraded usually. Conversely, It suffices to carry out the level scanning when the receiving level of some sector is degraded. The algorithm of FIG. 11 utilizes this property, so that the level scanning is carried out only when the sector selection is necessary, and the transceiver device 21 is utilized for the communication otherwise, so as to improve the utilization efficiency of the transceiver device 21.

Figure 12:
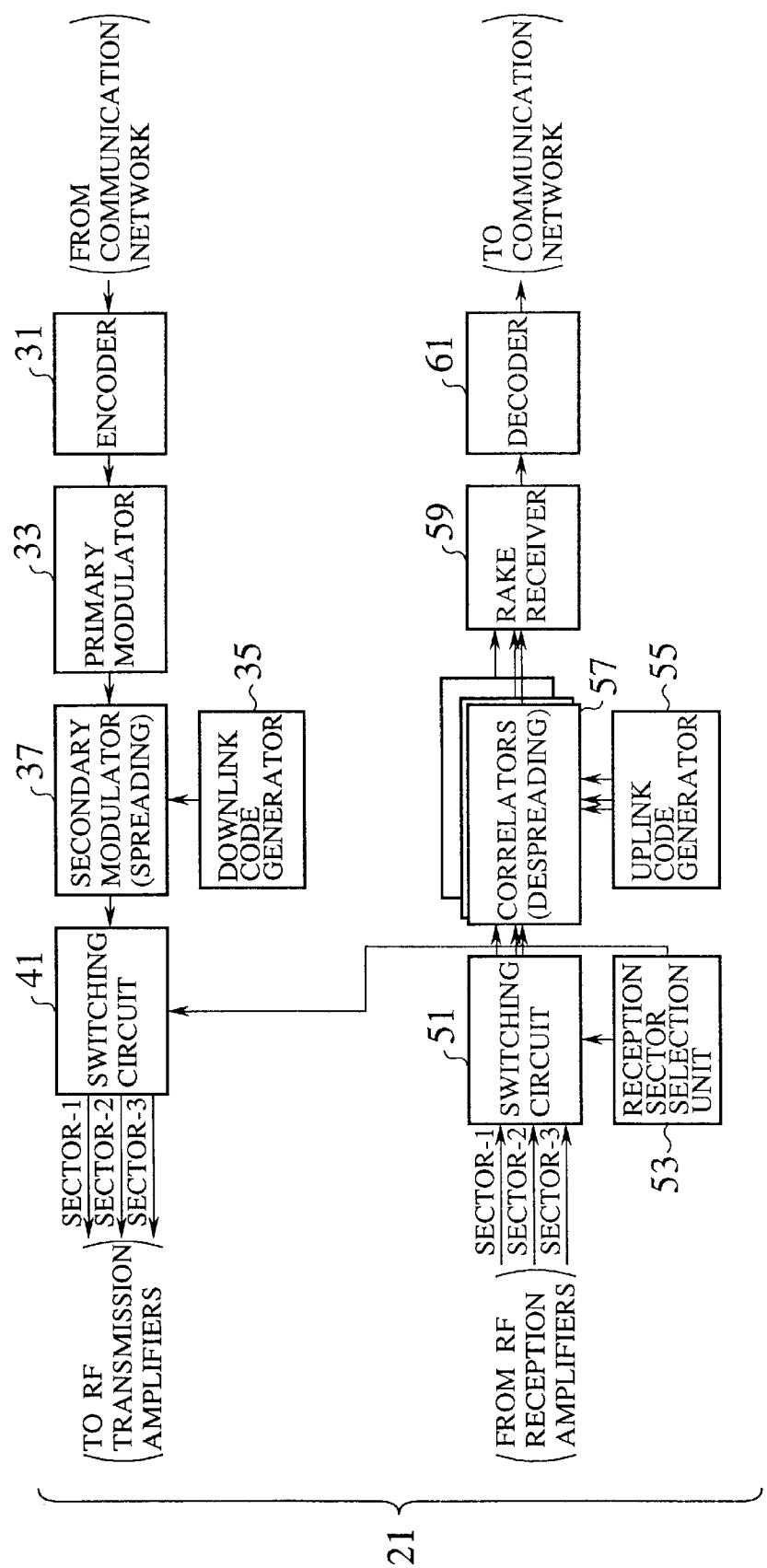
FIG. 12 is a block diagram of each transceiver device in the base station of FIG. 2 according to the sixth embodiment of the present invention.

Referring now to FIG. 12, the sixth embodiment of a CDMA mobile communication scheme according to the present invention will be described in detail.

In this sixth embodiment, all the reception sectors are selected as the transmission sectors while all the transmission sectors are controlled to transmit at the same transmission power in each base station, and to this end, a configuration of the transceiver device 21 in each base station is modified as shown in FIG. 12. The rest of the CDMA mobile communication system in this sixth embodiment is the same as that of the first embodiment.

This transceiver device 21 of FIG. 12 differs from that of FIG. 4 in that the transmission sector selection unit 39 of FIG. 4 is omitted, and the reception sector selection unit 53 controls the switching circuit 41 in the transmission section as well as the switching circuit 51 in the reception section. The rest of this configuration of FIG. 12 is the same as that of FIG. 4.

With this configuration, it is possible to carry out the transmission from those sectors which are currently carrying out the reception. The uplink and downlink receiving levels are correlated, so that the sector effective for the uplink communication is also effective for the downlink communication.

Thus, in this sixth embodiment, when a plurality of reception sectors are selected for the uplink communication at the base station, the transmission for the downlink communication is also carried out at a plurality of sectors, so that the site diversity composition gain can be obtained in the downlink communication, similarly as in the uplink communication.

Figure 13:
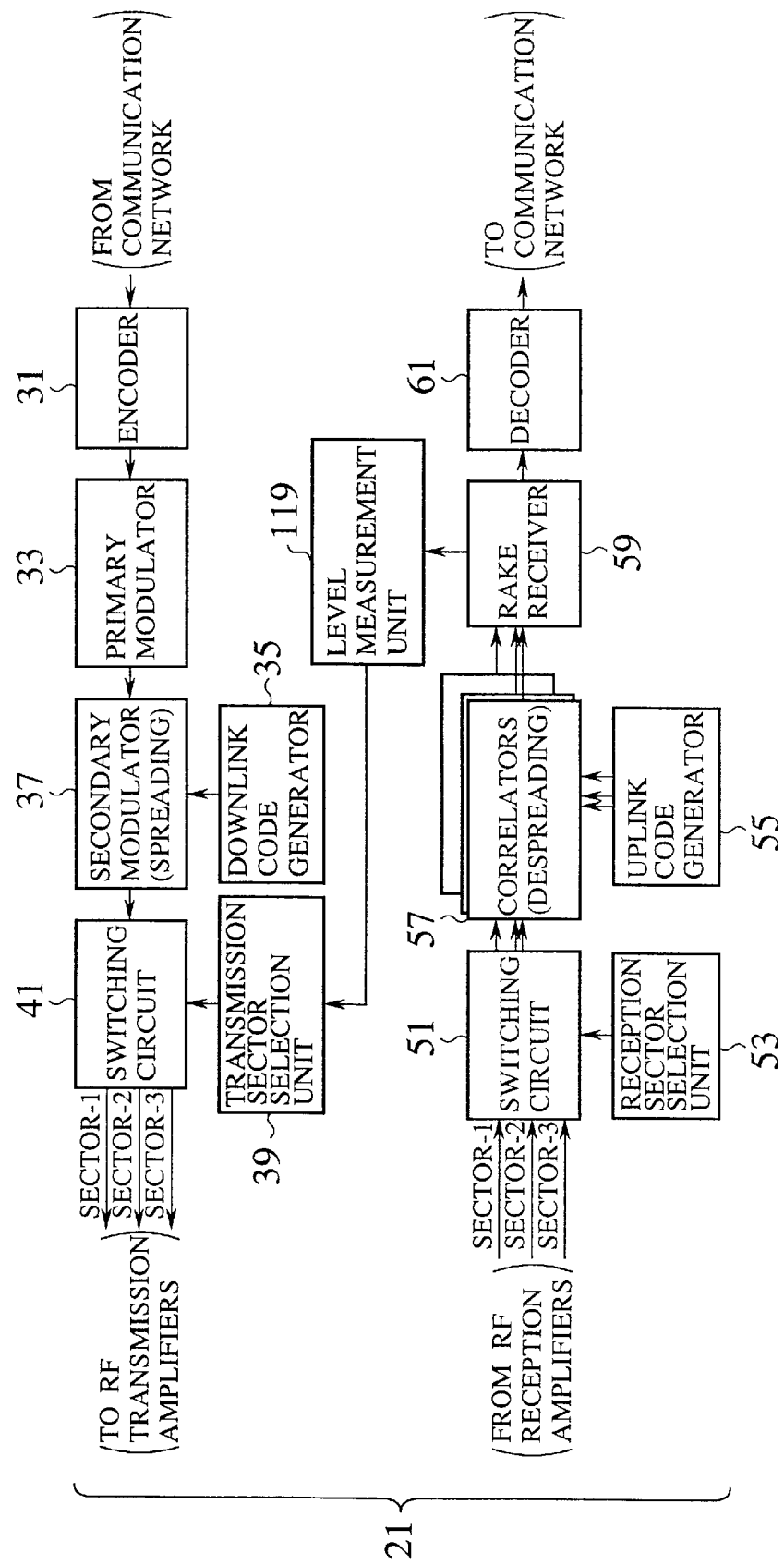
FIG. 13 is a block diagram of each transceiver device in the base station of FIG. 2 according to the seventh embodiment of the present invention.

Referring now to FIG. 13, the seventh embodiment of a CDMA mobile communication scheme according to the present invention will be described in detail.

In this seventh embodiment, the sector with the largest receiving level among the current reception sectors is selected as the transmission sector in each base station, and to this end, a configuration of the transceiver device 21 in each base station is modified as shown in FIG. 13. The rest of the CDMA mobile communication system in this seventh embodiment is the same as that of the first embodiment.

This transceiver device 21 of FIG. 13 differs from that of FIG. 4 in that the level measurement unit 119 connected with the transmission sector selection unit 39 and the RAKE receiver 59 is additionally provided. The rest of this configuration of FIG. 12 is the same as that of FIG. 4.

In the level measurement unit 119 of the transceiver device 21 shown in FIG. 13, the receiving level of each currently receiving sector at the RAKE receiver 59 is measured, and the measurement result is notified to the transmission sector selection unit 39. Then, at the transmission sector selection unit 39, the sector with the largest receiving level is selected, and the switching circuit 41 is controlled according to this selection result.

For the downlink communication, the interference power is increased and the capacity is adversely affected if the transmission is carried out at the sector for which the receiving level is small, that is, the sector at which the mobile station is not located, so that the transmission is carried out only at the sector with the largest receiving level in this seventh embodiment. In this manner, the interference power can be reduced and the capacity increasing effect due to the sector configuration can be improved further.

Figure 14:
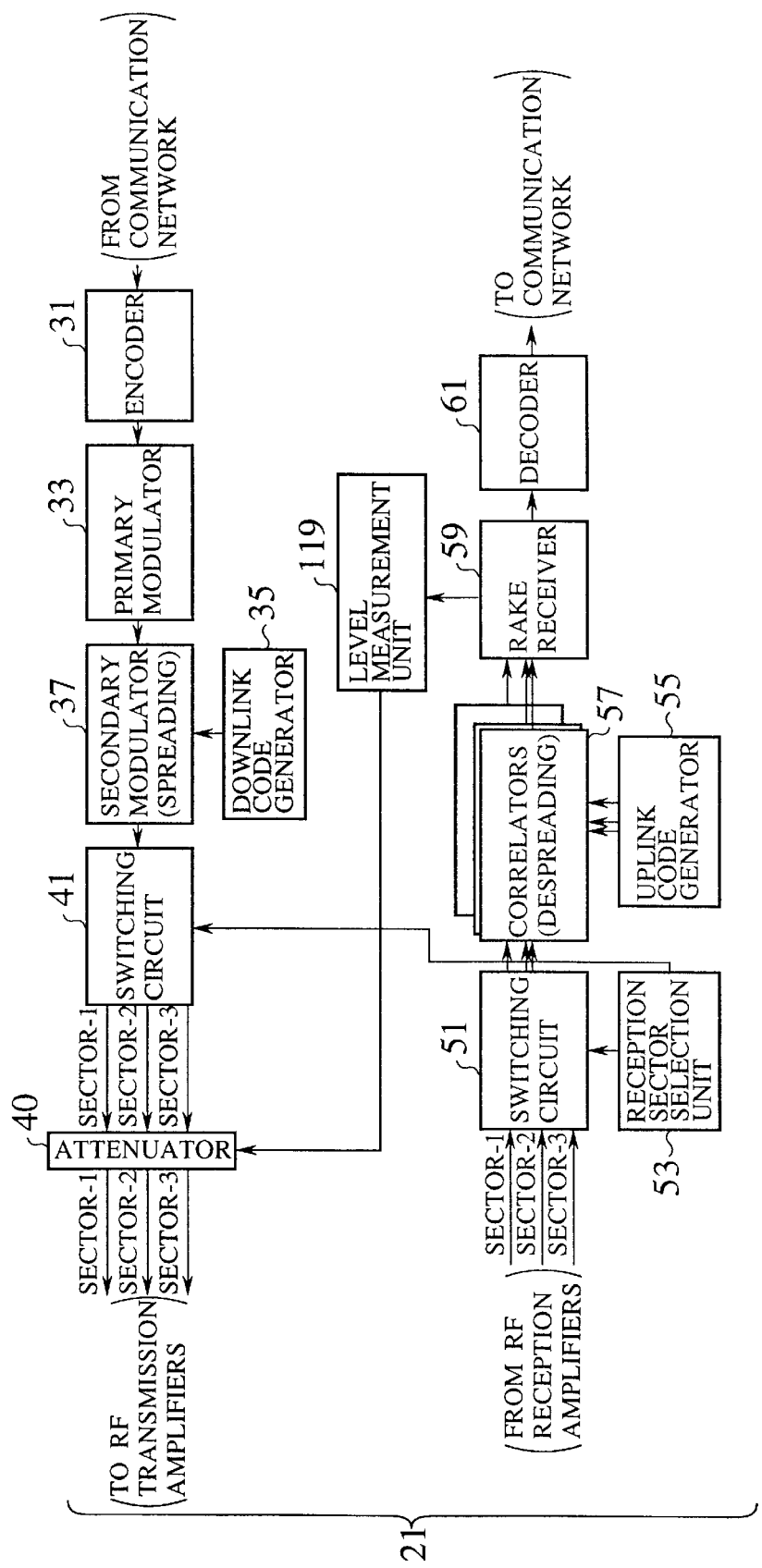
FIG. 14 is a block diagram of each transceiver device in the base station of FIG. 2 according to the eighth embodiment of the present invention.

Referring now to FIG. 14, the eighth embodiment of a CDMA mobile communication scheme according to the present invention will be described in detail.

In this eighth embodiment, the transmission power ratio among the transmission sectors are controlled so that the transmission power ratio becomes equal to the receiving level ratio among the sectors in each base station, and to this end, a configuration of the transceiver device 21 in each base station is modified as shown in FIG. 14. The rest of the CDMA mobile communication system in this eighth embodiment is the same as that of the first embodiment.

This transceiver device 21 of FIG. 14 differs from that of FIG. 4 in that an attenuator 40 is additionally provided on an output side of the switching circuit 41 in the transmission section, while the level measurement unit 119 connected with the attenuator 40 and the RAKE receiver 59 is additionally provided, and the reception sector selection unit 53 controls the switching circuit 41 in the transmission section as well as the switching circuit 51 in the reception section. The rest of this configuration of FIG. 14 is the same as that of FIG. 4.

In the level measurement unit 119 of the transceiver device 21 shown in FIG. 14, the receiving level of each currently receiving sector at the RAKE receiver 59 is measured, and the measurement result is notified to the attenuator 40. Here, the attenuator 40 has a function for attenuating the transmission power of each sector according to the notified receiving level measurement result for each sector.

When the attenuation level for the largest receiving level sector is set to 0 dB, the transmission power of each sector is attenuated in proportion to a difference between the largest receiving level and the receiving level at each sector.

For example, for a sector with the receiving level lower than the largest receiving level by 10 dB, the transmission power is attenuated by 10 dB, so that this sector carries out the transmission at the power which is 10 dB lower than the largest receiving level sector.

The uplink and downlink propagation characteristics do not necessary coincide with each other, so that the transmission is carried out even from a sector with a lower receiving level in this eighth embodiment, so as to obtain the site diversity composition gain.

On the other hand, by weighting the transmission powers of the sectors so that a sector with a higher receiving level transmits at a higher transmission power, it is possible to suppress an amount of interference to minimum.

Consequently, it becomes possible to increase the capacity efficiently according to this eighth embodiment.

Referring now to FIG. 15 to FIG. 19, the ninth embodiment of a CDMA mobile communication scheme according to the present invention will be described in detail.

In this ninth embodiment, the mobile station makes the sector selection and notifies the sector selection result to the base station by using a sector information inserted into a part of each perch channel at the base station.

FIG. 15 shows a configuration of each perch channel to be transmitted from the base station to the mobile station, which contains the sector information for identifying each sector. In this configuration of FIG. 15, a sector number is used as the sector information, and inserted between perch channel data. Here, the sector number is a serial number assigned to the sectors, such as "1" for the sector-1, "2" for the sector-2, and "3" for the sector-3, for example.

FIG. 16 shows a configuration of the communication channel to be transmitted from the mobile station to the base station, which contains a sector selection result. In this configuration of FIG. 16, the sector number is used for indicating the sector selection result, and inserted between communication data.

Figure 17:
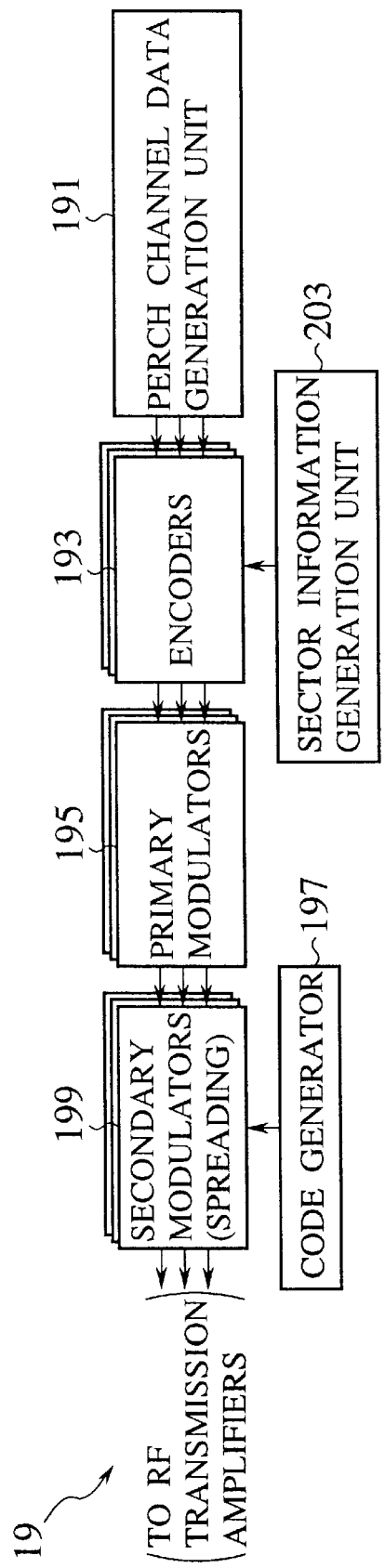
FIG. 17 is a block diagram of a perch channel transmitter device in the base station of FIG. 2 according to the ninth embodiment of the present invention.

FIG. 17 shows a configuration of the perch channel transmitter device 19 of each base station in this ninth embodiment, which has a function for inserting the sector information into the perch channel. This perch channel transmitter device 19 of FIG. 17 differs from that of FIG. 3 in that as many encoders 193, primary modulators 195, and secondary modulators 199 as a number of sectors at the base station are provided, while the distributor 201 of FIG. 3 is omitted, and a sector information generation unit 203 connected with the encoders 193 is additionally provided. The rest of this configuration of FIG. 17 is the same as that of FIG. 3.

Here, the sector information generation unit 203 generates the sector information to be inserted into the perch channel, and the generated sector information is inserted between the perch channel data by the encoders 193.

Figure 18:
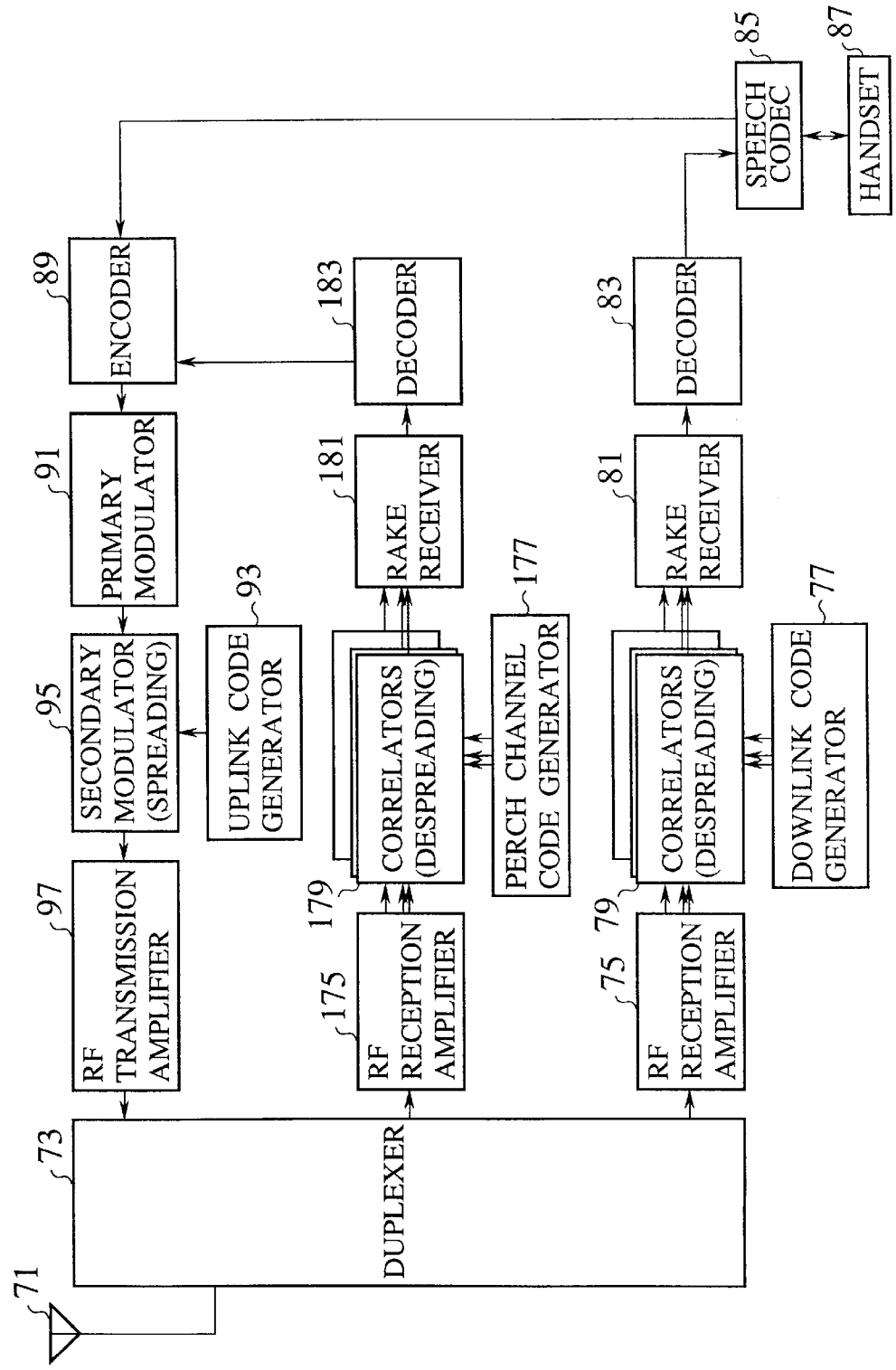
FIG. 18 is a block diagram of a mobile station in the system of FIG. 1 according to the ninth embodiment of the present invention.

FIG. 18 shows a configuration of the mobile station in this ninth embodiment, which has a function for selecting the base station transmission sector.

This mobile station of FIG. 18 differs from that of FIG. 5 in that a perch channel reception section formed by an RF reception amplifier 175 for receiving the perch channel, a perch channel code generator 177 for generating the perch channel spread code, correlators 179, a RAKE receiver 181, and a decoder 183 are additionally provided, where the RF reception amplifier 175 is connected with the duplexer 73 and the decoder 183 is connected with the encoder 89. The rest of this configuration of FIG. 18 is the same as that of FIG. 5.

In this perch channel reception section, the perch channel is received and one transmission sector is selected according to the received perch channel, and then the sector information is extracted from the decoded perch channel of the selected transmission sector and supplied to the encoder 89, so as to insert the sector number of the selected transmission sector into the communication channel as shown in FIG. 16.

Note that the perch channel reception section described in this ninth section has been omitted in the other embodiments described above as it is unnecessary for explaining the essential features of these other embodiments, but a usual mobile station has a configuration corresponding to this perch channel reception section for the purpose of cell judgement, so that there is no need to newly incorporate this perch channel reception section in a usual mobile station.

Figure 19:
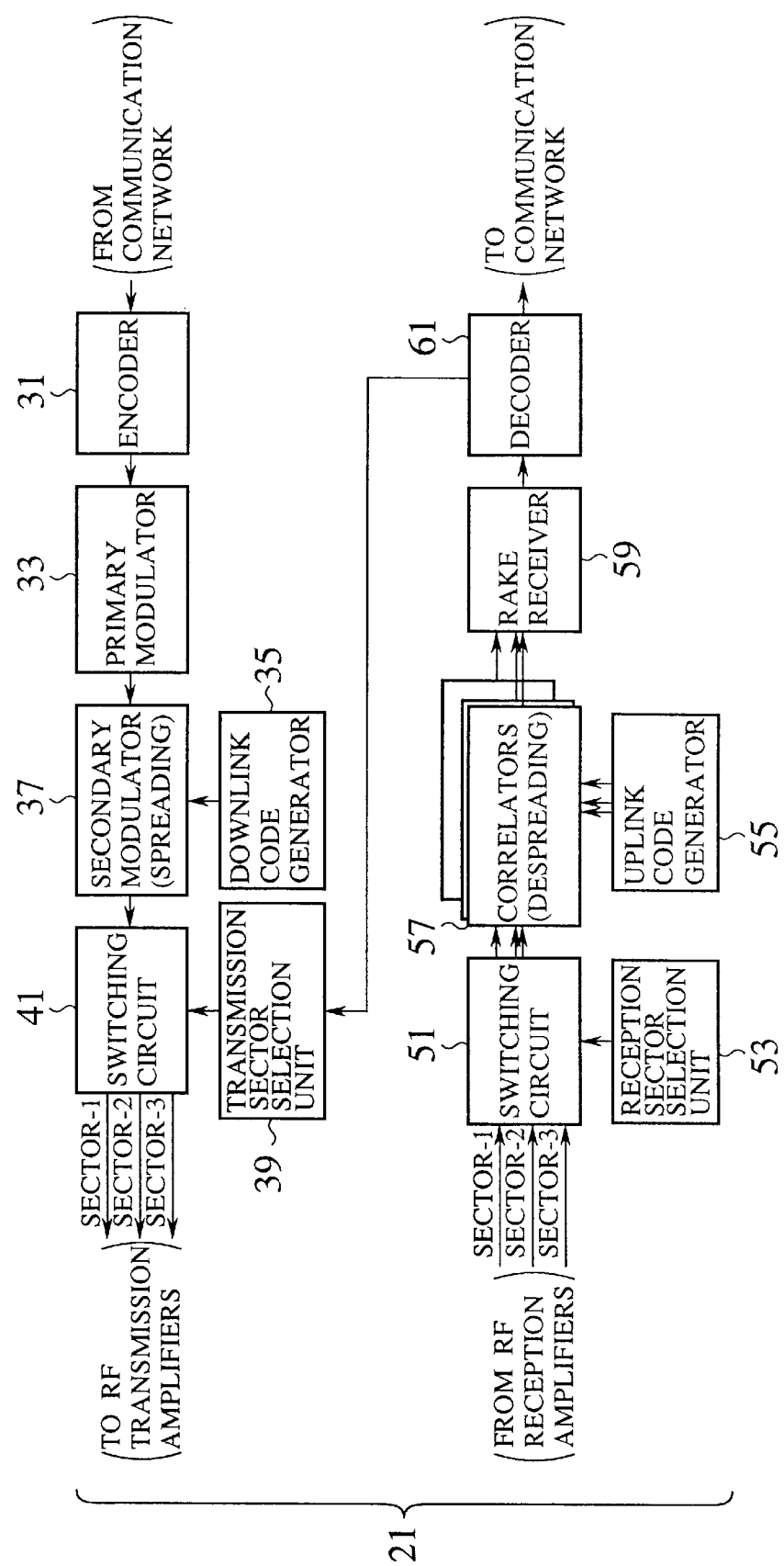
FIG. 19 is a block diagram of each transceiver device in the base station of FIG. 2 according to the ninth embodiment of the present invention.

FIG. 19 shows a configuration of the transceiver device 21 of each base station in this ninth embodiment, which has a function of carrying out the transmission from the sector selected by the mobile station.

This transceiver device 21 of FIG. 19 differs from that of FIG. 4 in that the decoder 61 extracts the sector information from the communication channel, and notifies the extracted sector information to the transmission sector selection unit 39. The rest of this configuration of FIG. 19 is the same as that of FIG. 4.

With this configuration, it is possible to carry out the transmission from the sector selected by the mobile station, and the sector selection can be made according to the downlink propagation characteristic, so that it becomes possible to realize a more accurate transmission sector selection.

As a consequence, the transmission power can be minimized, and the capacity can be increased according to this ninth embodiment.

Referring now to FIG. 20 to FIG. 23, the tenth embodiment of a CDMA mobile communication scheme according to the present invention will be described in detail.

In this tenth embodiment, the transmission timings of the communication channels from different sectors are displaced from each other.

Figure 20:
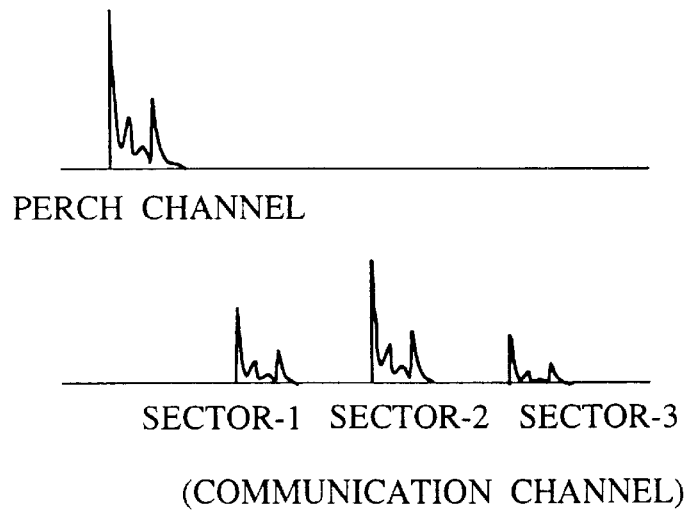
FIG. 20 is a diagram showing received waveforms at a mobile station in the system of FIG. 1 according to the tenth embodiment of the present invention.

FIG. 20 shows received waveforms of the perch channel and the communication channels from three sectors at the mobile station in this tenth embodiment. As shown in FIG. 10, the transmission timings of the communication channels from three sectors are displaced with respect to the transmission timing of the perch channel by mutually different timing differences, so that the mobile station can identify each sector according to a difference between a receiving timing of the perch channel and a receiving timing of each communication channel, and carry out the receiving level measurement for each sector.

Figure 21:
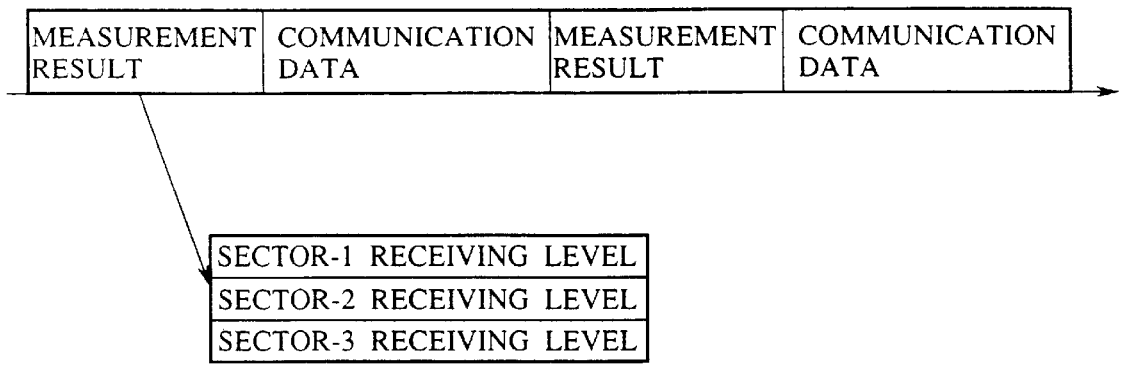
FIG. 21 is a diagram showing a configuration of a communication channel according to the tenth embodiment of the present invention.

FIG. 21 shows a configuration of the communication channel to be transmitted from the mobile station to the base station in this tenth embodiment, in which the measurement result information indicating the receiving level of each sector is inserted between the communication data.

Figure 22:
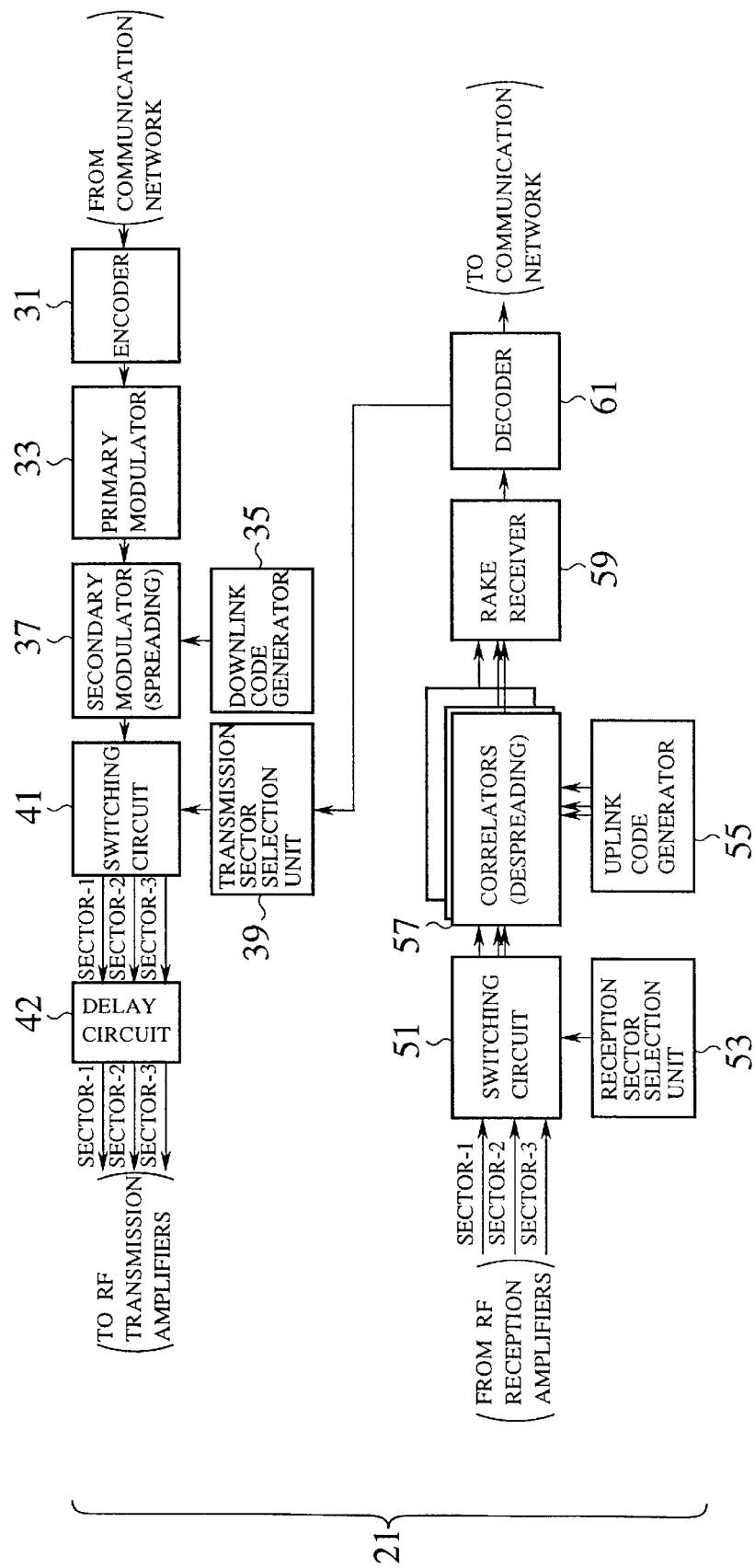
FIG. 22 is a block diagram of each transceiver device in the base station of FIG. 2 according to the tenth embodiment of the present invention.

FIG. 22 shows a configuration of the transceiver device 21 of each base station in this tenth embodiment, which has a function for displacing the transmission timings of the communication channels with respect to the transmission timing of the perch channel.

This transceiver device 21 of FIG. 22 differs from that of FIG. 4 in that a delay circuit 42 is newly provided on an output side of the switching circuit 41, while the decoder 61 extracts the measurement result information from the communication channel, and notifies the extracted measurement result information to the transmission sector selection unit 39. The rest of this configuration of FIG. 22 is the same as that of FIG. 4.

Figure 23:
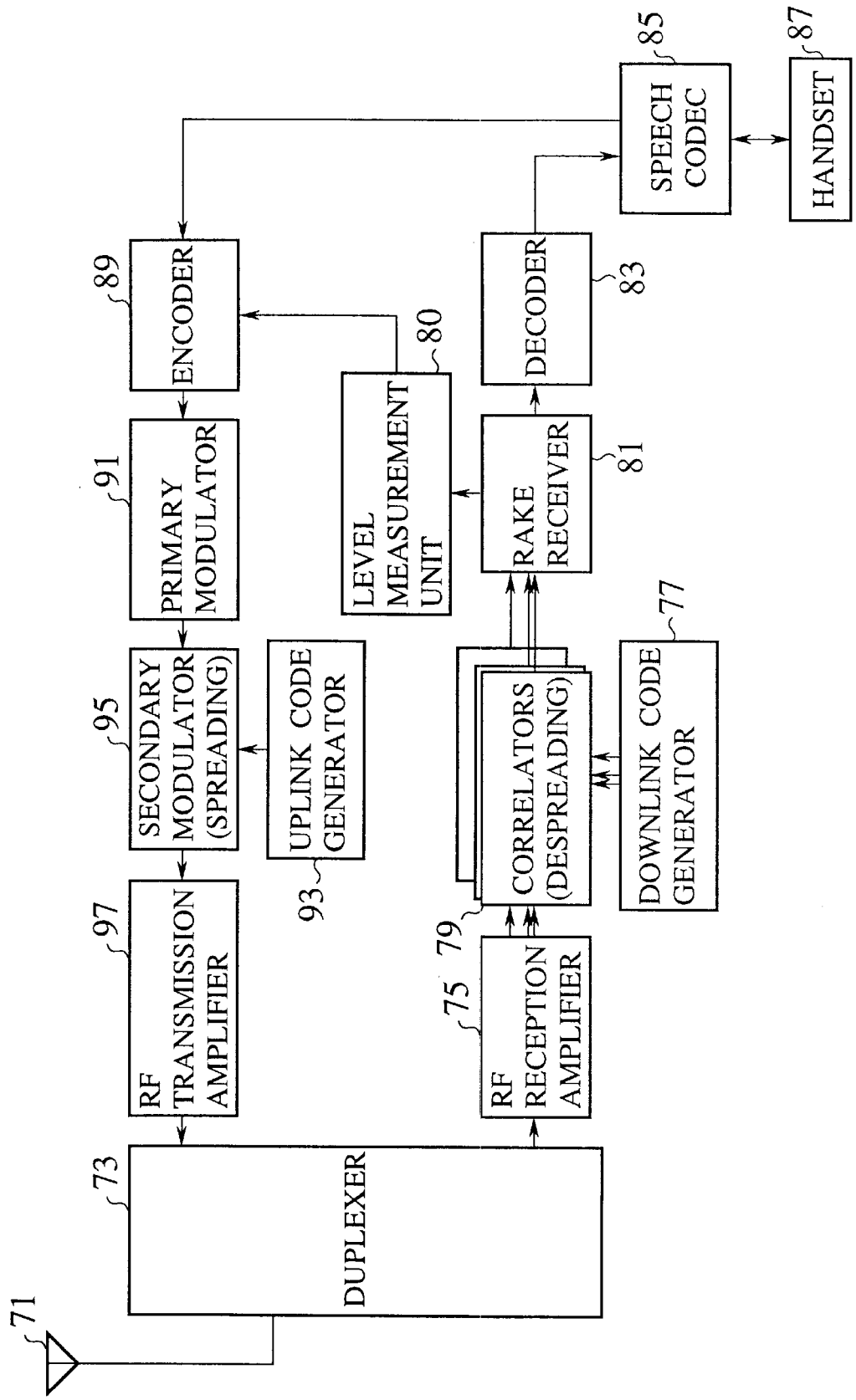
FIG. 23 is a block diagram of a mobile station in the system of FIG. 1 according to the tenth embodiment of the resent invention.

FIG. 23 shows a configuration of the mobile station in this tenth embodiment, which has a function for reporting the reception sector and the receiving level.

This mobile station of FIG. 23 differs from that of FIG. 5 in that a level measurement unit 80 connected with the RAKE receiver 81 and the encoder 89 is additionally provided. The rest of this configuration of FIG. 23 is the same as that of FIG. 5.

In the transceiver device 19 of FIG. 22, the delay circuit 42 applies different delays for different sectors so that the communication channels of different sectors are displaced as indicated in FIG. 20.

Also, the level measurement unit 80 of the mobile station shown in FIG. 23 measures the receiving level of each sector at the RAKE receiver 81 which is receiving signals in the waveforms as shown in FIG. 20, and sends the measurement result to the encoder 89. Then, the encoder 89 inserts the measurement result information into the communication channel as shown in FIG. 21.

In the decoder 61 of the transceiver device 21 shown in FIG. 22, the measurement result information indicating the receiving level of each sector at the mobile station is extracted from the communication channel, and the extracted measurement result information is sent to the transmission sector selection unit 39.

At the transmission sector selection unit 39, the transmission sector is selected by comparing the receiving levels of all the sectors. Here, the sector with the largest receiving level can be selected as the transmission sector, or the sector for which a difference between the maximum receiving level and the measured receiving level is not greater than a prescribed value, such as 5 dB for example, can be selected as the transmission sector.

Then, all the selected transmission sectors are controlled to transmit at the same transmission power in each base station.

By means of this control, the site diversity composition gain due to the simultaneous transmission from a plurality of sectors can be obtained, while it is possible to carry out the transmission from the sector selected by the mobile station, and the sector selection can be made according to the downlink propagation characteristic, so that it becomes possible to realize a more accurate transmission sector selection.

As a consequence, the transmission power can be minimized, and the capacity can be increased according to this tenth embodiment.

Figure 24:
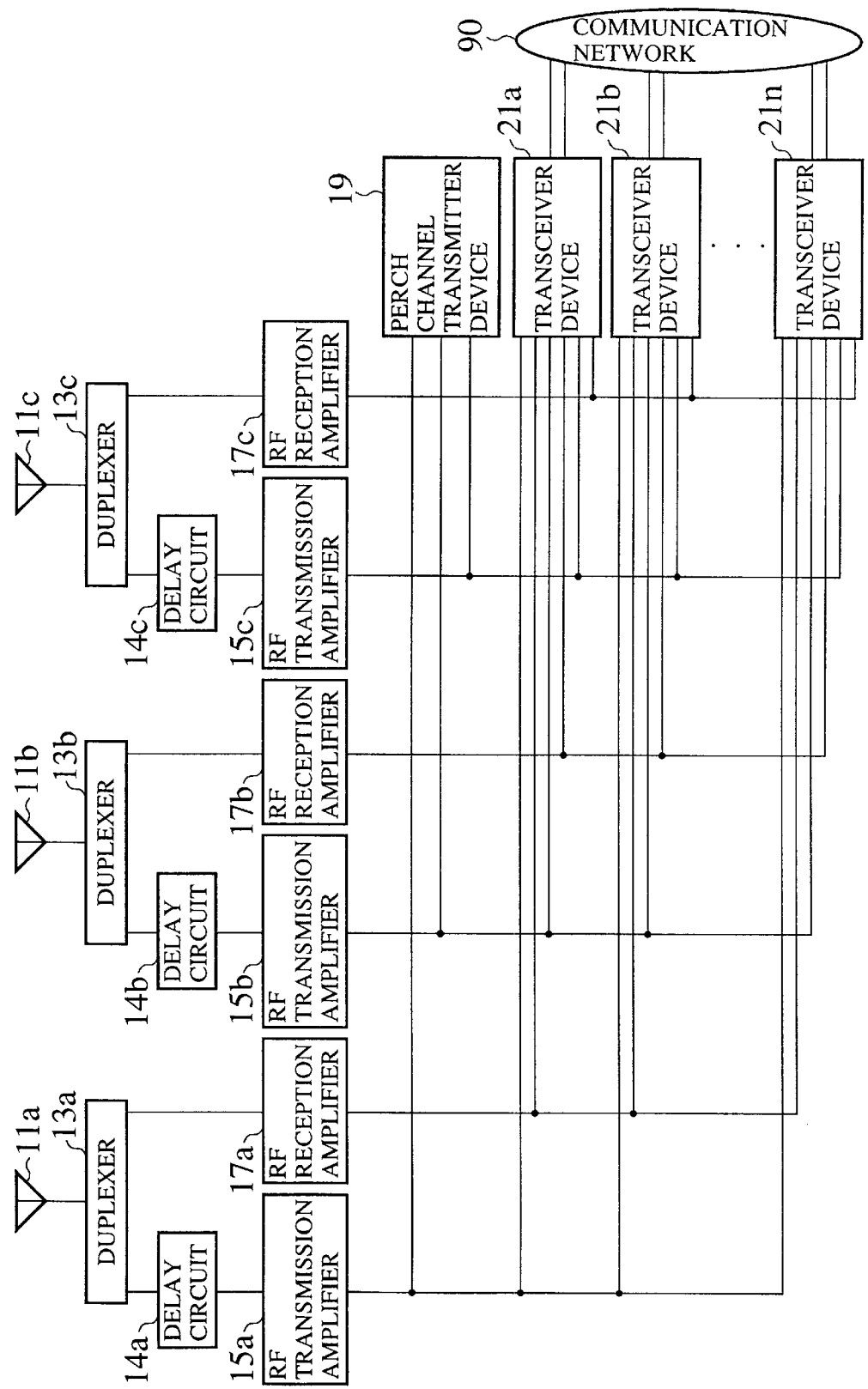
FIG. 24 is a block diagram of each base station in the system of FIG. 1 according to the eleventh embodiment of the present invention.
Figure 25:
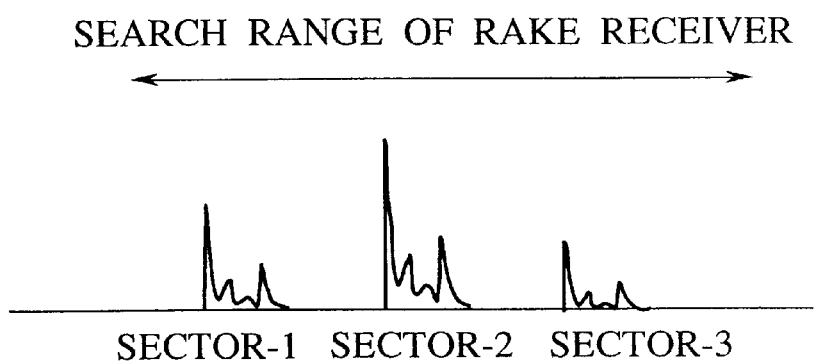
FIG. 25 is a diagram showing received waveforms at a mobile station in the system of FIG. 1 according to the eleventh embodiment.
Figure 26:
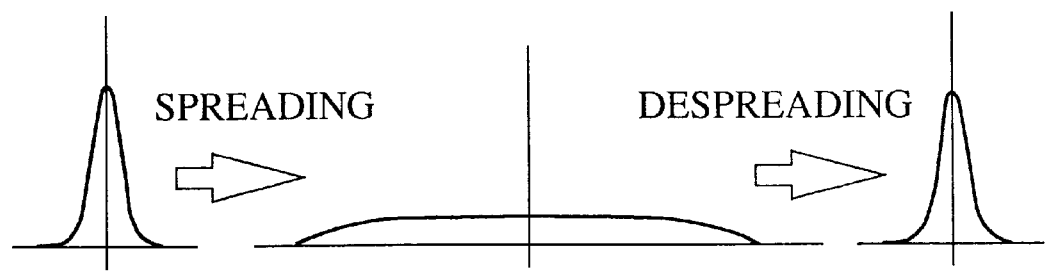
FIG. 26 is a diagram showing an exemplary change of the waveform (frequency region) in the spectrum spread scheme.

Referring now to FIG. 24 and FIG. 25, the eleventh embodiment of a CDMA mobile communication scheme according to the present invention will be described in detail.

In this eleventh embodiment, the transmission timings of the communication channels from different sectors are displaced from each other.

FIG. 24 shows a configuration of each base station in this eleventh embodiment, which differs from that of FIG. 2 in that delay circuits 14a, 14b and 14c are additionally provided at output side of the RF transmission amplifiers 15a, 15b and 15c, respectively, in order to carry out the transmission at different timings from different sectors. The rest of this configuration of FIG. 24 is the same as that of FIG. 2.

The delay circuits 14 of the base station shown in FIG. 24 apply such delays that signals from different sectors becomes separable at the RAKE receiver of the mobile station while the different transmission timings for a plurality of sectors of the base station are contained within a search range of the RAKE receiver of the mobile station. In this case, the configuration of the mobile station can be the same as that of FIG. 5.

FIG. 25 shows the received waveforms for signals from three sectors at the mobile station in this eleventh embodiment. As indicated in FIG. 25, even when the transmission is carried out simultaneously from a plurality of sectors, the signals from different sectors do not overlap at any timing, so that the reception paths are separated and the characteristic of the RAKE receiver can be improved.

Consequently, the capacity can be increased according to this eleventh embodiment.

It is to be noted that it is not absolutely necessary for the CDMA mobile communication scheme of present invention to use the identical perch channel spread code for all the sectors of each base station as described above, and the present invention can be modified in such a manner that more than one sectors of at least one base station in the system uses the identical perch channel spread code.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of mobile communication in a CDMA mobile communication system including base stations connected to a communication network and mobile stations for carrying out communications in a CDMA scheme with the base stations, each base station having a plurality of sectors dividing a cell of each base station, the method comprising the steps of:

transmitting a perch channel spread by a single perch channel spread code assigned to each base station, from each one of at least two sectors of each base station, such that each mobile station determines its connection target base station according to perch channels received from different base stations;

receiving upward signals at more than one reception sectors of each base station from those mobile stations which determined each base station as their connection target base station according to the perch channel transmitted by the transmitting step, despreading the upward signals received at said more than one reception sectors by using an identical uplink spread code, and carrying out a maximal ratio combining of despread upward signals at each base station, in a case of carrying out a simultaneous reception at said more than one reception sectors; and spreading downward signals by using an identical downlink spread code at each base station, and transmitting spread downward signals from more than one transmission sectors of each base station to those mobile stations which determined each base station as their connection target base station according to the perch channel transmitted by the transmitting step, in a case of carrying out a simultaneous transmission from said more than one transmission sectors.

2. The method of claim 1, wherein at the transmitting step, the perch channel is transmitted from every one of said plurality of sectors.

3. The method of claim 1, further comprising the step of:

selecting at least one reception sector for receiving the upward signals from each mobile station and at least one transmission sector for transmitting the downward signals to each mobile station, at each base station.

4. The method of claim 1, wherein the receiving step always carries out the simultaneous reception at all of said plurality of sectors.

5. The method of claim 1, further comprising the steps of:

measuring receiving levels of the upward signals by using a level scanning receiver device provided in correspondence to each sector, by sequentially scanning uplink spread codes assigned to those mobile stations which are currently communicating with each base station; and selecting at least one reception sector for receiving the upward signals from each mobile station, according to the receiving levels measured by the measuring step, at each base station.

6. The method of claim 1, further comprising the steps of:

measuring receiving levels of the upward signals by using a level scanning receiver device provided in correspondence to each mobile station, by sequentially switching a sector for carrying out a reception using an uplink spread code assigned to each mobile station; and selecting at least one reception sector for receiving the upward signals from each mobile station, according to the receiving levels measured by the measuring step, at each base station.

7. The method of claim 1, further comprising the steps of:

measuring receiving levels of the upward signals by using a receiver device for receiving the upward signals from each mobile station which is provided in correspondence to one sector among said more than one reception sectors, by sequentially switching a sector for carrying out a reception using an uplink spread code assigned to each mobile station, when a difference between a receiving level at said one sector and a largest receiving level among said more than one reception sectors becomes greater than a prescribed value while the simultaneous reception at said more than one reception sectors is carried out; and selecting said more than one reception sectors for receiving the upward signals from each mobile station, according to the receiving levels measured by the measuring step, at each base station.

8. The method of claim 1, further comprising the step of:

selecting those sectors among said plurality of sectors which are currently receiving the upward signals from each mobile station, as transmission sectors for transmitting the downward signals to each mobile station, at each base station; and wherein the spreading step carries out the simultaneous transmission from the transmission sectors selected by the selecting step, by using an identical transmission power for each transmission sector.

9. The method of claim 1, further comprising the step of:

selecting one sector for which a receiving level is largest among those sectors which are currently receiving the upward signals from each mobile station, as a transmission sector for transmitting the downward signals to each mobile station, at each base station.

10. The method of claim 1, further comprising the step of:

selecting those sectors among said plurality of sectors which are currently receiving the upward signals from each mobile station, as transmission sectors for transmitting the downward signals to each mobile station, at each base station; and wherein the spreading step carries out the simultaneous transmission from the transmission sectors selected by the selecting step, by using a transmission power ratio equal to a receiving level ratio for the transmission sectors.

11. The method of claim 1, wherein at the transmitting step, the perch channel transmitted from each sector contains a sector information for identifying each sector, and the method further comprises the steps of:

selecting one transmission sector for transmitting the downward signals to each mobile station, according to the sector information contained in the connection target perch channel transmitted from each sector, at each mobile station; and notifying said one transmission sector selected by the selecting step from each mobile station to the base station by using the sector information contained in the perch channel transmitted from each sector, so that the spreading step carries out a transmission from said one transmission sector.

12. The method of claim 1, wherein the spreading step transmits the downward signals from different sectors through communication channels at different timings with respect to a transmission timing of the perch channel, and the method further comprises the steps of:

identifying each sector from which the downward signals are currently received at each mobile station according to a difference between a receiving timing of the perch channel and a receiving timing of each communication channel, measuring a receiving level of a communication channel for each identified sector, and notifying each identified sector and a measured receiving level for each identified sector from each mobile station to the connection target base station; and selecting at least one transmission sector for transmitting the downward signals to each mobile station, according to the measured receiving level for each identified sector notified from each mobile station, at the connection target base station.

13. The method of claim 12, wherein the selecting step selects more than one transmission sectors, and the spreading step carries out the simultaneous transmission from said more than one transmission sectors selected by the selecting step, by using an identical transmission power for said more than one transmission sectors.

14. The method of claim 1, wherein the spreading step transmits the downward signals from different sectors through communication channels at different timings within a search range of a RAKE receiver of each mobile station, said different timings being set so that the communication channels of different sectors are separable by the RAKE receiver of each mobile station.

15. A base station apparatus for use in a CDMA mobile communication system including base stations connected to a communication network and mobile stations for carrying out communications in a CDMA scheme with the base stations, each base station having a plurality of sectors dividing a cell of each base station, the base station apparatus of each base station comprising:

a perch channel transmission device for transmitting a perch channel spread by a single perch channel spread code assigned to each base station, from each one of at least two sectors of each base station, such that each mobile station determines its connection target base station according to perch channels received from different base stations;

a communication channel reception device for receiving upward signals at more than one reception sectors of each base station from those mobile stations which determined each base station as their connection target base station according to the perch channel transmitted by the perch channel transmission device, despreading the upward signals received at said more than one reception sectors by using an identical uplink spread code, and carrying out a maximal ratio combining of despread upward signals at each base station, in a case of carrying out a simultaneous reception at said more than one reception sectors; and a communication channel transmission device for spreading downward signals by using an identical downlink spread code at each base station, and transmitting spread downward signals from more than one transmission sectors of each base station to those mobile stations which determined each base station as their connection target base station according to the perch channel transmitted by the perch channel transmission device, in a case of carrying out a simultaneous transmission from said more than one transmission sectors.

16. The apparatus of claim 15, wherein the perch channel transmission device transmits the perch channel from every one of said plurality of sectors.

17. The apparatus of claim 15, further comprising:

a reception sector selection unit for selecting at least one reception sector for receiving the upward signals from each mobile station; and a transmission sector selection unit for selecting at least one transmission sector for transmitting the downward signals to each mobile station.

18. The apparatus of claim 15, wherein the communication channel reception device always carries out the simultaneous reception at all of said plurality of sectors.

19. The apparatus of claim 15, further comprising:

a level scanning receiver device provided in correspondence to each sector, for measuring receiving levels of the upward signals by sequentially scanning uplink spread codes assigned to those mobile stations which are currently communicating with each base station; and a reception sector selection unit for selecting at least one reception sector for receiving the upward signals from each mobile station according to the receiving levels measured by the level scanning receiver device.

20. The apparatus of claim 15, further comprising:

a level scanning receiver device provided in correspondence to each mobile station, for measuring receiving levels of the upward signals by sequentially switching a sector for carrying out a reception using an uplink spread code assigned to each mobile station; and a reception sector selection unit for selecting at least one reception sector for receiving the upward signals from each mobile station according to the receiving levels measured by the level scanning receiver device.

21. The apparatus of claim 15, wherein the communication channel reception device includes:

a receiver device for receiving the upward signals from each mobile station which is provided in correspondence to each sector, the receiver device for one sector among said more than one reception sectors being used for measuring receiving levels of the upward signals by sequentially switching a sector for carrying out a reception using an uplink spread code assigned to each mobile station, when a difference between a receiving level at said one sector and a largest receiving level among said more than one reception sectors becomes greater than a prescribed value while the simultaneous reception at said more than one reception sectors is carried out; and a reception sector selection unit for selecting said more than one reception sectors for receiving the upward signals from each mobile station according to the receiving levels measured by the receiver device for said one sector.

22. The apparatus of claim 15, further comprising:

a sector selection unit for selecting those sectors among said plurality of sectors which are currently receiving the upward signals from each mobile station, as transmission sectors for transmitting the downward signals to each mobile station; and wherein the communication channel transmission device carries out the simultaneous transmission from the transmission sectors selected by the sector selection unit, by using an identical transmission power for each transmission sector.

23. The apparatus of claim 15, further comprising:

a sector selection unit for selecting one sector for which a receiving level is largest among those sectors which are currently receiving the upward signals from each mobile station, as a transmission sector for transmitting the downward signals to each mobile station.

24. The apparatus of claim 15, further comprising:

a sector selection unit for selecting those sectors among said plurality of sectors which are currently receiving the upward signals from each mobile station, as transmission sectors for transmitting the downward signals to each mobile station; and wherein the communication channel transmission device carries out the simultaneous transmission from the transmission sectors selected by the sector selection unit, by using a transmission power ratio equal to a receiving level ratio for the transmission sectors.

25. The apparatus of claim 15, wherein the perch channel transmitted from each sector by the perch channel transmission device contains a sector information for identifying each sector, so that each mobile station selects one transmission sector for transmitting the downward signals to each mobile station according to the sector information contained in the perch channel transmitted from each sector, and notifies said one transmission sector to the connection target base station by using the sector information contained in the perch channel transmitted from each sector; and the communication channel transmission device carries out a transmission from said one transmission sector notified from each mobile station.

26. The apparatus of claim 15, wherein the communication channel transmission device transmits the downward signals from different sectors through communication channels at different timings with respect to a transmission timing of the perch channel by the perch channel transmission device, so that each mobile station identifies each sector from which the downward signals are currently received according to a difference between a receiving timing of the perch channel and a receiving timing of each communication channel, measures a receiving level of a communication channel for each identified sector, and notifies each identified sector and a measured receiving level for each identified sector to the connection target base station; and the apparatus further comprises:

a transmission sector selection unit for selecting at least one transmission sector for transmitting the downward signals to each mobile station according to the measured receiving level for each identified sector notified from each mobile station.

27. The apparatus of claim 26, wherein the transmission sector selection unit selects more than one transmission sectors, and the communication channel transmission device carries out the simultaneous transmission from said more than one transmission sectors selected by the transmission sector selection unit, by using an identical transmission power for said more than one transmission sectors.

28. The apparatus of claim 15, wherein the communication channel transmission device transmits the downward signals from different sectors through communication channels at different timings within a search range of a RAKE receiver of each mobile station, said different timings being set so that the communication channels of different sectors are separable by the RAKE receiver of each mobile station.

29. A mobile station apparatus for use in a CDMA mobile communication system including base stations connected to a communication network and mobile stations for carrying out communications in a CDMA scheme with the base stations, wherein each base station has a plurality of sectors dividing a cell of each base station and transmits a perch channel spread by a single perch channel spread code assigned to each base station, from each one of at least two sectors of each base station, and the perch channel transmitted from each sector contains a sector information for identifying each sector, the mobile station apparatus of each mobile station comprising:

a perch channel reception device for receiving the perch channel transmitted from each sector of each base station, determining a connection target base station according to perch channels received from different base stations, and selecting one transmission sector for transmitting downward signals from the connection target base station to said mobile station apparatus according to the perch channel transmitted from each sector of the connection target base station;

a communication channel reception device for receiving the downward signals transmitted from the connection target base station; and a communication channel transmission device for transmitting upward signals to the connection target base station, the upward signals containing a portion for notifying said one transmission sector to the connection target base station by using the sector information contained in the perch channel transmitted from each sector of the connection target base station, so that the connection target base station carries out a transmission from said one transmission sector notified from said mobile station apparatus.

30. A mobile station apparatus for use in a CDMA mobile communication system including base stations connected to a communication network and mobile stations for carrying out communications in a CDMA scheme with the base stations, wherein each base station has a plurality of sectors dividing a cell of each base station, transmits a perch channel spread by a single perch channel spread code assigned to each base station, from each one of at least two sectors of each base station, and transmits downward signals from different sectors through communication channels at different timings with respect to a transmission timing of the perch channel, the mobile station apparatus of each mobile station comprising:

a perch channel reception device for receiving the perch channel transmitted from each sector of each base station and determining a connection target base station according to perch channels received from different base stations;

a communication channel reception device for receiving the downward signals transmitted from the connection target base station, identifying each sector from which the downward signals are currently received according to a difference between a receiving timing of the perch channel and a receiving timing of each communication channel, and measuring a receiving level of a communication channel for each identified sector; and a communication channel transmission device for transmitting upward signals to the connection target base station, the upward signals containing a portion for notifying each identified sector and a measured receiving level for each identified sector to the connection target base station, so that the connection target base station selects at least one transmission sector for transmitting the downward signals from the connection target base station to said mobile station apparatus according to the measured receiving level for each identified sector notified from said mobile station apparatus.

* * * * *